US006828959B2

(12) United States Patent
Takekawa et al.

(10) Patent No.: US 6,828,959 B2
(45) Date of Patent: *Dec. 7, 2004

(54) METHOD AND DEVICE FOR INPUTTING COORDINATE-POSITION AND A DISPLAY BOARD SYSTEM

(75) Inventors: Kenichi Takekawa, Aichi (JP); Tsutomu Ogasawara, Aichi (JP); Takahiro Ito, Aichi (JP)

(73) Assignee: Ricoh Company, Ltd., Tokyo (JP)

( * ) Notice: Subject to any disclaimer, the term of this patent is extended or adjusted under 35 U.S.C. 154(b) by 135 days.

This patent is subject to a terminal disclaimer.

(21) Appl. No.: 10/000,090

(22) Filed: Dec. 4, 2001

(65) Prior Publication Data

US 2002/0050985 A1 May 2, 2002

Related U.S. Application Data

(63) Continuation of application No. 09/349,461, filed on Jul. 9, 1999, now Pat. No. 6,335,724.

(30) Foreign Application Priority Data

Jan. 29, 1999 (JP) ........................................... 11-022382
Feb. 4, 1999 (JP) ........................................... 11-027776

(51) Int. Cl.[7] ................................................ G09G 5/00
(52) U.S. Cl. ..................... 345/173; 345/175; 178/18.01; 178/18.09
(58) Field of Search .............................. 345/173, 174, 345/175, 176, 177, 178, 179, 182, 104; 178/18.01, 18.1, 18.05, 18.09, 18.03

(56) References Cited

U.S. PATENT DOCUMENTS

| 4,507,557 | A | * | 3/1985 | Tsikos ..................... 250/341.7 |
|---|---|---|---|---|
| 4,703,316 | A | | 10/1987 | Sherbeck ..................... 345/175 |
| 4,713,698 | A | * | 12/1987 | Takahashi et al. .......... 358/296 |
| 4,725,694 | A | * | 2/1988 | Auer et al. .................. 345/173 |
| 4,777,482 | A | | 10/1988 | Kaneko et al. ............. 345/175 |
| 4,782,328 | A | | 11/1988 | Denlinger ....................... 341/5 |
| 4,812,830 | A | | 3/1989 | Doering ....................... 355/54 |
| 4,827,084 | A | * | 5/1989 | Yaniv et al. ............. 178/18.05 |
| 4,851,616 | A | | 7/1989 | Wales et al. ................. 345/175 |
| 5,023,408 | A | * | 6/1991 | Murakami et al. ....... 178/18.07 |
| 5,176,522 | A | * | 1/1993 | Robertson, Jr. ............. 434/415 |
| 5,305,114 | A | * | 4/1994 | Egashira et al. ............ 358/401 |
| 5,414,413 | A | | 5/1995 | Tamaru et al. .............. 345/175 |
| 5,708,460 | A | * | 1/1998 | Young et al. ................ 345/173 |
| 5,973,667 | A | * | 10/1999 | Kaye ........................... 345/156 |
| 6,100,538 | A | * | 8/2000 | Ogawa ................... 250/559.29 |
| 6,285,359 | B1 | * | 9/2001 | Ogasawara et al. ......... 345/175 |
| 6,335,724 | B1 | * | 1/2002 | Takekawa et al. .......... 345/173 |
| 6,532,006 | B1 | * | 3/2003 | Takekawa et al. .......... 345/173 |

FOREIGN PATENT DOCUMENTS

JP          9-901094          4/1997

* cited by examiner

Primary Examiner—Xiao Wu
(74) Attorney, Agent, or Firm—Oblon, Spivak, McClelland, Maier & Neustadt, P.C.

(57) ABSTRACT

The coordinate-position input device has a frame with a reflecting member for recursively reflecting light provided in an inner side from four edges of the frame forming a rectangular form. Two optical units irradiate light to the reflecting members and receive the reflected light. With the mounting member(s) the frame can be detachably attached to a white board. The two optical units are located at both ends of any one of frame edges forming the frame, and at the same time the two optical units and the frame body are integrated to each other.

46 Claims, 23 Drawing Sheets

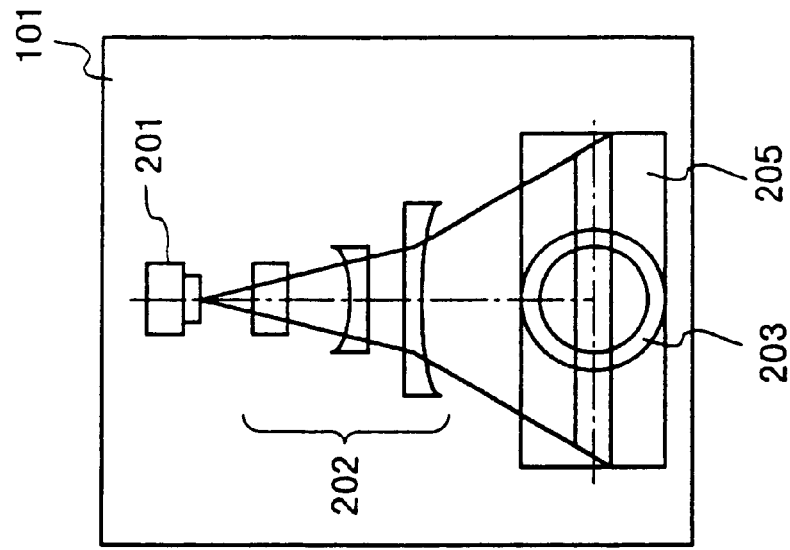
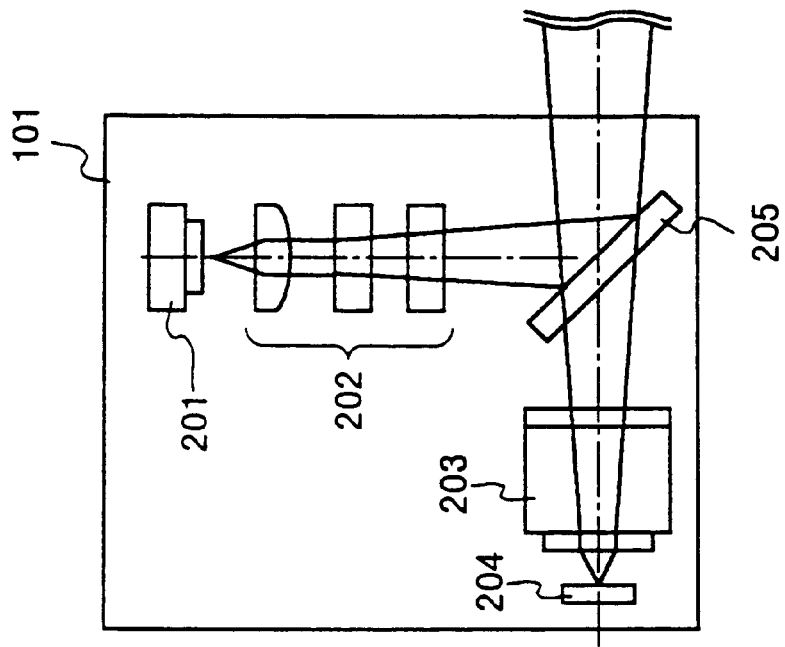
FIG.3A
FIG.3B

CONTENTS WRITTEN ON THE WHITE BOARD

STATE IN THE FRAME MEMORY

METHOD AND DEVICE FOR INPUTTING COORDINATE-POSITION AND A DISPLAY BOARD SYSTEM

FIELD OF THE INVENTION

The present invention relates to a method and device for inputting a coordinate position. A touch-panel surface is formed by irradiating light on the surface of a white board or a display unit which light is substantially parallel to the surface and a position on the surface of the white board or the display unit is inputted by detecting a position on the surface where the light forming the touch-panel surface is blocked. More particularly the invention relates to a device for inputting coordinate position in which can be detachably attached to the writing surface of a white board or display surface of a display unit. The present invention also relates to a display board system which uses the coordinate-position input device for inputting a manually specified position as the coordinate position.

BACKGROUND OF THE INVENTION

When a white board (or a blackboard) is used in a meeting or delivering a lecture in a school or a college or the like, in order to record the contents written on the white board it has been general to copy the contents into a notebook by hand or to input the contents in some memory using a word processor or the like. In recent years, in association with the widespread use of digital cameras or the like, there has also been employed a method of recording the contents written on a white board by photographing the contents.

A display board device with a scanner and a printer provided to a white board is becoming popular. In such a device, contents written on the white board are scanned and read, and the read contents can directly be printed (recorded) onto a paper with the help of the printer.

Further, there has been also proposed a display board system having a large display unit such as a plasma display, a coordinate-position input device and a control unit for controlling these components. The coordinate-position input device forms a touch-panel surface on the display surface of the display unit. Information (coordinate position) is input into the coordinate-position input device instead of directly writing on the white board. The information input into the coordinate-position input device is displayed onto the display surface of the display unit and the information can be stored in a storing device such as a memory as well.

As a method of detecting a coordinate position by the coordinate-position input device provided in this type of electronic blackboard device, there is a method of irradiating light onto the entire surface provided in a coordinate position input area and detecting a position of a pen on this surface by detecting the reflected light. Such a method is disclosed in Japanese Patent Laid-Open Publication No. HEI 9-91094. Disclosed in this Japanese Patent Laid-Open Publication No. HEI 9-91094 is a device which scans light so as to irradiate the light onto the entire surface by driving a light source with the help of a driving unit.

There is now a device having a further simplified structure in which the driving unit from the device described above is eliminated. In such a device, the light emitted from a light source is spread in a fan shape with the help of a lens or the like so that the ight is spread over the entire area of the writing surface. FIG. 23 explains the principles of this type of method in a simple maimer. The device shown in the figure has a panel 80 as a writing surface. Reflecting members 2 are provided on three sides of the panel 80. A light source R is provided at a corner in the lower right side thereof in the figure, and a light source L is provided at a corner in the lower left side thereof It should be noted that a point $P(x_p, y_p)$ on the panel 80 shows a position of a tip of a pen thereon.

In the structure shown in the figure, light beams emitted from the light source R and the light source L are spread by lenses (not shown herein) located in the front section of the light sources R and L respectively, and each of the spread light becomes a flux of light (a fan-shaped light flux) having a fan shape with a central angle of 90 degrees respectively. The fan-shaped light flux is reflected by the reflecting members 2 provided on the three sides of the panel 80, the reflecting members 2 are so designed that the fan-shaped light flux is reflected therefrom along the optical path which is same as at the time of its emission. Therefore, the reflected fan-shaped light fluxes travel in the direction of the light sources r and L along the same optical path as at the time of their emission. Further, for instance, each of the light fluxes is directed towards a light receiving section (not shown herein) by a mirror (not shown herein) provided on the optical path and detected therein.

With such a structure as described above, when the tip of a pen is present at the position of the point P on the panel 80, some light passing through the point P of the fan-shaped light flux is reflected by the pen tip and can not reach the reflecting members 2 (this state is described in the following specification as a state in which the light is blocked by a pen tip). Because of that, only the reflected light of the light passing through the point P of the fan-shaped light flux can not resultantly be detected by the light receiving section. At this point, if a CCD line sensor is used as a light receiving section, for instance, the optical axis of the light not having been received can be identified from the entire reflected light.

It is known that the optical axis of the reflected light is identical to that of the emitted light and that the point P is present on the optical axis of the light which has not been detected, so that the angle of emission of the light passing through the point P can be computed from the optical axis of the reflected light which has not been detected. Accordingly, emission angles $\theta_L$ and $\theta_R$ are obtained from the results of light reception by the two light receiving sections, and optical axis $a_L$ and optical axis $a_R$ can be obtained from these two emission angles respectively. Further, the coordinates $(x_p, y_p)$ of the point P can be computed as a point of intersection of those optical axis $a_L$ and optical axis $a_R$.

More specifically, the coordinates $(x_p, y_p)$ of the point P are obtained as described below. Namely, $$x_p = (W \cdot \tan\theta_R)/(\tan\theta_L + \tan\theta_R) \tag{1}$$

$$y_P = (\tan\theta_L \cdot W \cdot \tan\theta_R)/(\tan\theta_L + \tan\theta_R) \tag{2}$$

$$= x_p \cdot \tan\theta_L$$

Where W is a distance between the centers of the light source R and light source L.

With the method described above, the coordinate-position input device described above can automatically record the contents written on the panel 80 by reading the locus of a pen tip by means of successively reading the coordinate positions of the pen tip moving along the panel 80.

In the conventional technology, however, there are problems as described below when contents written on a white board is recorded.

In order to record the contents written on a white board, it is required to copy the contents into a notebook by hand or to input the contents with the help of a word processor or the like, so that work by hand is essential in both of the cases. The copying work (copying the contents into a notebook) or the inputting work (inputting the contents into a word processor) is troublesome, inconvenient and therefore disadvantageous.

Secondly, when contents written on a white board are recorded by photographing it with a digital camera or the like, the contents have to be photographed at a location some distance from the board so that the entire white board can be viewed through the viewfinder of the camera. When a photograph is taken from a distance, information written on the white board with the small characters is hard to be interpreted from such a photograph.

On the other hand, the conventional display board device or the conventional display board system has problems as described below.

Although the information on a white board can easily be recorded by scanning the surface of a white board with a scanner and then printing the information onto a paper by using a printer, in this case, the method is realized based on the condition that a display board device with a white board, a scanner, and a printer integrated together is used. With such a configuration, there is a disadvantage that the display board device become very expensive.

Secondly, since the display board device or the display board system is used together with one particular white board or an integrated board with a display unit incorporated in the device or the system, in other words, the display board device or the display board system is not designed for general purpose use. For example, such a system can not be used with a white board or a display unit other than the specific white board or the display unit. Thus, the conventional type of the device or system has not been capable of solving the problems coming up when contents written on a white board or a display unit each generally used as a discrete device are recorded.

Further the conventional type of coordinate-position input device has problems as described below.

When a coordinate-position input device having a touch-panel surface or the like and a display unit which are not previously integrated to each other, the display surface of the display unit is difficult to be used as a touch-panel surface. A coordinate-position input device which can easily be mountable onto the display surface of a display unit has not been proposed.

Secondly, emission angles $\theta_R$ and $\theta_L$ obtained by the method used in the-conventional type of coordinate-position input device depend on the angle (attached angle) at which the light source R and the light source L are attached to the panel 80. Therefore, the coordinates of the point P computed from the emission angles $\theta_R$ and $\theta_L$ also vary in association with the attached angles. If the attached angles are not what they actually should be, then there is a disadvantage that the position of a pen tip can not accurately be read, which results in the fact that the written contents can not accurately be recorded.

A concrete method for computing the emission angles is described below.

FIG. 24 shows a relation between the emission angle $\theta_L$, the light source L and the attached angle $\beta_L$ of the light source L when the emission angle $\theta_L$ is obtained. It should be noted that while FIG. 24 explains the case for the light source L, the attached angle $\beta_R$ of the light source R can be obtained in a similar manner as described here.

In FIG. 24, an axis as indicated by a phantom line is an optical axis passing through the center of light emitted from the light source L. Herein, a CCD line sensor c as a light receiving section is so provided that the light having the axis $a_s$ as its optical axis is received by an element positioning at the center o of the sensor. It is assumed that the angle between an axis (described 0-axis in the figure) parallel to the lower edge of the panel 80 and the axis $a_s$ is the attached angle $\beta_L$. It is also assumed that a distance between the light source L and the center o of the CCD line sensor c is t, and further a distance between the CCD element which has detected a blockage such as due to a pen tip and the center o thereof is a.

In the example shown in FIG. 24 for obtaining the emission angle $\theta_L$, at first, an angle as a difference between the attached angle $\beta_L$ and the emission angle $\theta_L$ is $\alpha_L$, and then this angle $\alpha_L$ is obtained from the equation described below.

$$\tan \alpha_L = a/t \qquad (4)$$

Then, the emission angle is obtained by the equation described below from the obtained angle $\alpha_L$.

$$\theta_L = \beta_L - \alpha_L \qquad (5)$$

As described above, it is clear that, when the actual attached angle of the light source L with respect to the CCD line sensor c is displaced from the attached angle $\beta_L$ used in equation (5), the value of $\theta_L$ will be inaccurate and the coordinates $(x_p, y_p)$ of point P computed according to the value $\theta_L$ will also be inaccurate.

It is required, in order to prevent the location of a blockage from its being sensed inaccurately due to displacement of the attache dangle, that precision of attaching a light receiving section such as a CCD line sensor or a light to the device is mechanically enhanced or that adjustment precision after attachment thereof is enhanced. However, much of the technology described above requires guesswork and experience of skilled engineers, and because of that, it has been thought to be generally inappropriate that this technology is applied to products mass-produced.

SUMMARY OF THE INVENTION

It is a first object of the present invention to enable, for the purpose of solving the problems described above, recording of contents written on a white board easily and readably without using the hands as well as to provide general versatility applicable to an ordinary white board.

It is a second object of the present invention to provide a coordinate-position input device usable by easily mounting on a display surface of a display unit with high general versatility.

It is a third object of the present invention to provide a coordinate-position input device attachable with higher precision as compared to a light receiving section and a light source as well as to provide a display board system using this coordinate-position input device.

Further, it is a fourth object of the present invention to provide a coordinate-position input device which can accurately compute displacement of an attached angle and accurately read written contents by easily correcting this displacement as well as to provide a display board system using this coordinate-position input device.

With the present invention, a frame body having two optical units integrated in it is detachably attached to a writing surface of a white board or a display surface of a display unit by utilizing mounting members. Further, a touch-panel surface is formed on the writing surface or the display surface by using the two optical units as well as reflecting members located in the frame body and a position where the light that forms the touch-panel surface is blocked is detected. Thus it becomes possible to input a coordinate position on the writing surface or the display surface.

With the present invention, it is possible to input a coordinate position, by detachably attaching a frame body to a writing surface of a white board or a display surface of a display unit using mounting members, further attaching two optical units to the frame body to adjust each irradiating direction of light therefrom, forming a touch-panel surface with the two optical units as well as reflecting members located in the frame body and detecting a position where the light for forming the touch-panel surface is blocked, on the write-in surface or the display surface thereof.

With the present invention, a computing section computes a coordinate position of a blocked point on the writing surface or the display surface from a direction of reflected light not received by light receiving sections of the two optical units as well as from a distance between the light receiving sections thereof, so that a coordinate position of the blocked point can be outputted from the coordinate-position input device.

With the present invention, when a coordinate-position input mode and an input suspend mode are exclusively specified by a specifying unit, a control unit provides controls over the two optical units and/or the computing section according to the specified mode, which allows the user to freely select either the case where a coordinate position is inputted through the touch-panel surface or the case where a coordinate position is not inputted.

With the present invention, the frame body can be attached in any of the longitudinal direction and the lateral direction, which allows flexibility for attaching the frame body to a writing surface of a white board or a display surface of a display unit to be enhanced.

With the present invention, a mounting member is made with any of a magnet, a hook, a form enabling hanging, a suction cup, a face-type fastener, an engaging form, and an adhesive or a combination thereof, which allows the device of the invention to be attached to the white board or display unit with its simple structure.

With the present invention, each edge of the frame is extendable in multi-steps by an adjustment mechanism, and the reflecting member is wound into a roll inside the adjustment mechanism when the frame is contracted, so that the frame body may be contracted when it is to be carried or extended when it is to be used, which allows its transportability to be enhanced.

With the present invention, each edge of the frame is extendable in multi-steps by an adjustment mechanism, and the reflecting member is also extendable in multi-steps together with the frame edge, so that the frame body may be contracted when it is to be carried or extended when it is to be used, which allows its transportability to be enhanced.

With the present invention, the coordinate position of obstacle can be stored in a storing section.

With the present invention, the coordinate position of the obstacle can be stored in an external memory, and the stored contents can easily be accessed by utilizing some other equipment by attaching the external memory thereto.

With the present invention, the coordinate position of the obstacle can be stored on a frame memory.

With the present invention, even when a light emitting unit and a light detecting unit are attached to or detached from an area defining member, a positional relation between the light emitting unit and the light detecting unit can be maintained to be constant at any time.

With the present invention, even when a light emitting unit and a light detecting unit are attached to or detached from an area defining member, a positional relation between the light emitting unit and the light detecting unit can be maintained to be constant at any time, and in addition the state of emission and detection can also be maintained to be constant at any time.

With the present invention, the precision of alignment between an optical unit and an area defining member can comparatively easily be enhanced.

With the present invention, it is possible to instantly and quantitatively recognize the displacement in an angle at which the optical unit is attached.

With the present invention, it is possible to instantly and quantitatively recognize the displacement in an angle at which the optical unit is attached and detect the coordinates of the position of a blockage corresponding to this displacement.

With the present invention, it is possible to visually recognize the occurrence of displacement in an angle at which the optical unit is attached and detect the coordinates of the position of a blockage corresponding to this displacement.

With the present invention, the configuration thereof can be simplified by suppressing an increase in the number of components.

With the present invention, any one of the coordinate-position input devices described above can be applied to a display board system.

Other objects and features of this invention will become understood from the following description with reference to the accompanying drawings.

BRIEF DESCRIPTION OF THE DRAWINGS

FIG. 3A and FIG. 3B explain a structure of an optical unit of the coordinate-position input device;

FIG. 14A is a side view of the optical unit, and FIG. 14B is a front view thereof (a surface from which light is emitted);

DESCRIPTION OF THE PREFERRED EMBODIMENTS

Detailed description is made hereinafter for Embodiments 1 to 5 of the method and device for inputting coordinate position according to the present invention with reference to the attached drawings.

Figure 1:
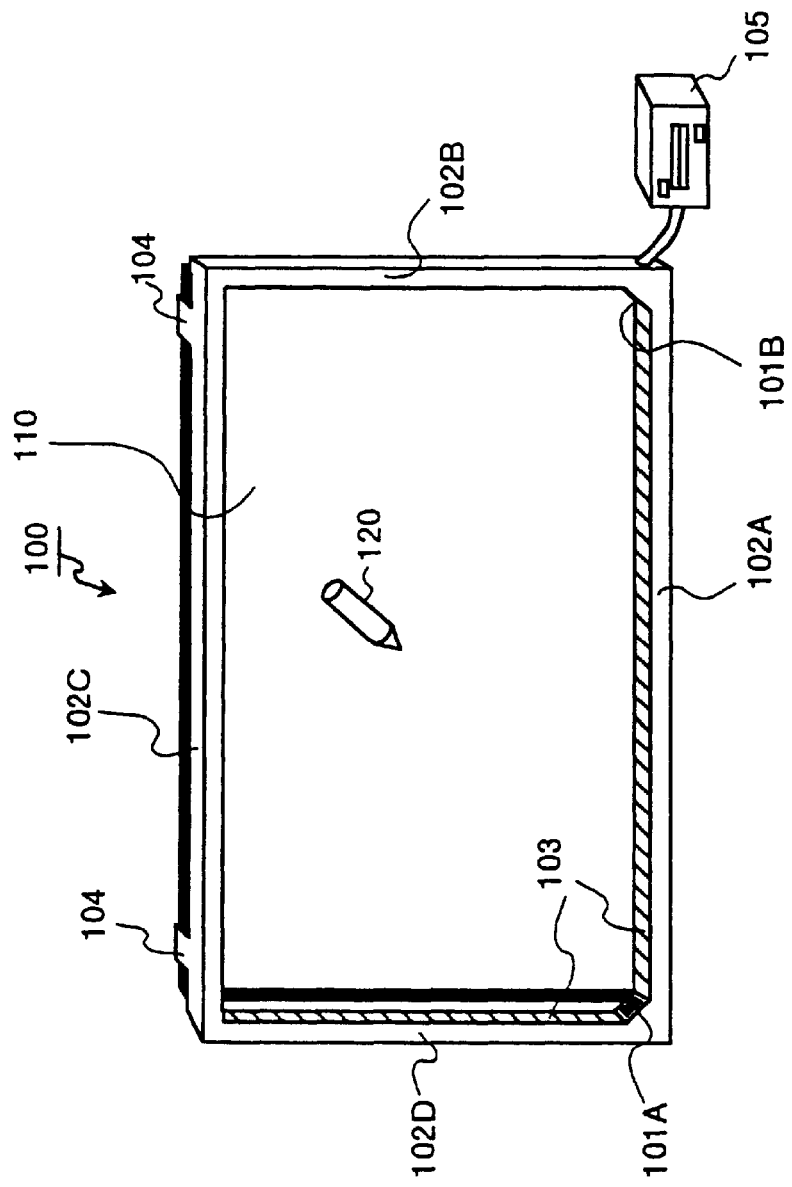
FIG. 1 is an external view showing general configuration of the coordinate-position input device according to the present invention.

At first, a general configuration of the coordinate-position input device will be described below. FIG. 1 is an external view showing a general configuration of the coordinate-position input device according to the present invention. The coordinate-position input device 100 comprises a frame body having four edges 102A to 102D and having a rect-angular form. Reflecting members 103 for recursively reflecting light are provided on the inner side of the four edges 102A to 102D. Two optical units 101A and 101B (described the optical unit 101 hereinafter when the two optical units 101A and 101B are collectively described) each with a light source section are provided for irradiating light which is substantially parallel with respect to a white board 110. A light-receiving section which is integrated with the optical unit 101 is provided for receiving light reflected from the reflecting members 103. A mounting member 104 is provided for detachably attaching the frame body to the white board 110. The two optical units 101A and 101B are located at the two ends of the edge 102A forming the frame body. Further, the optical unit 101 and the frame body are integrated to each other.

The coordinate-position input device 100 has a processing unit 105 comprising a computing section, a storing section, an input specifying section, and a control section each described later provided outside of the frame body and optical unit 101 which are integrated to each other. A pen 120 used for writing on the white board 110 is also shown in the figure. It should be noted that a surface scanned with the light irradiated from a light source to the white board 110 will be called a touch-panel surface.

Next, structure of the frame body, optical unit 101, mounting member 104, and processing unit 105 in the order thereof will be described.

(Structure of the Frame Body)

Figure 2A:
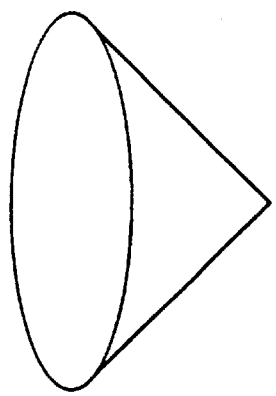
FIG. 2A to FIG. 2C explain the elements constituting a reflecting member located in the frame body and an arrangement thereof.
Figure 2B:
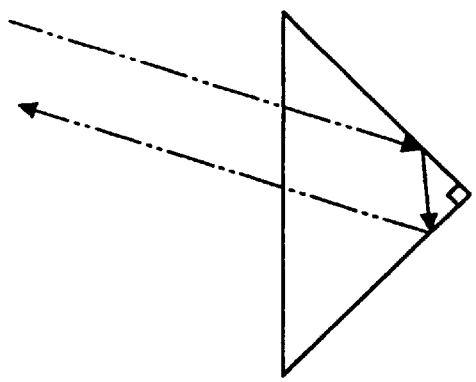
Figure 2C:
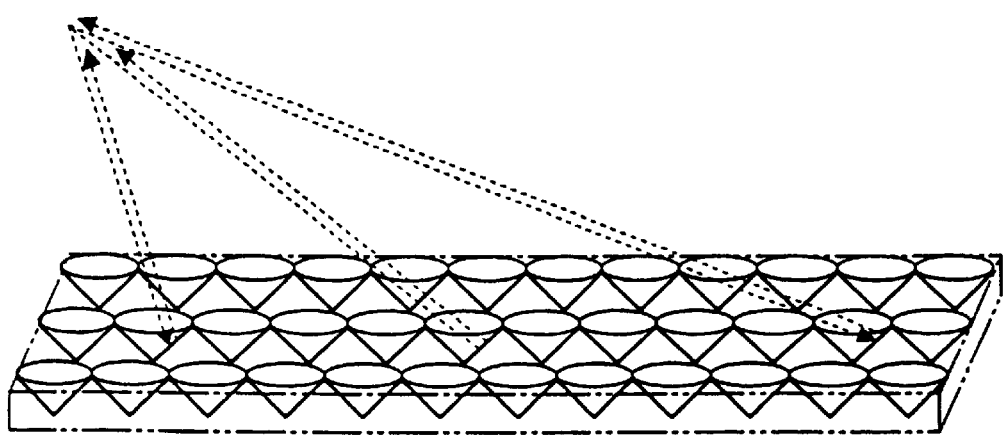

The frame body in Embodiment 1 comprises rigid integrated frame edges 102A to 102D having a rectangular shape, and reflecting members 103 are located in an inner side of the frame edges 102A to 102D. FIG. 2A and FIG. 2B show the elements constituting the reflecting members 103 located in the frame body and FIG. 2C explains an arrangement thereof. The reflecting members 103 recursively reflect incident light from the optical unit 101 thereto. In general, there has been known a corner cube reflector shown in FIG. 2A as a reflecting member having the recursive property described here. The corner cube reflector is conical in shape having an apex angle of 90 degrees as shown in FIG. 2B. A material with a high reflectivity such as aluminum is provided on the inner surface thereof. This shape is known to have recursive property based on geometrical optics.

A corner cube array (Refer to FIG. 2C) where a large number of corner cube reflectors are arranged is embedded in the inner side of the frame body. As the frame body is integrally constructed and has rigidity, torsion is not generated among the four edges of the frame 102A to 102D. As high-reflectivity corner cube array is used for the reflecting member 103, it is possible to provide a coordinate-position input device 100 with optical unit 101 described later having an excellent in light-receiving efficiency.

(Structure of the Optical Unit)

The optical unit 101 is located at both the ends of any of the frame edges 102A to 102D and each of which comprises a light source section and a light receiving section. FIG. 3A and FIG. 3B explain a structure of the optical unit 101. FIG. 3A is a side view of the optical unit 101 and FIG. 3B is a front view thereof.

The light source section comprises a laser diode 201 for oscillating the light, a diffusing lens 202 for diffusing the oscillated light to 90 degrees, and a half mirror 205 for deviating the diffused light and irradiating it onto the reflecting members 103 of two frame edges (e.g., frame edges 102B and 102C for the optical unit 101A). While the light receiving section comprises the half mirror 205 for passing therethrough the reflected light recursively reflected by the reflecting members 103, a light-receiving lens 203 for converging the light passing through the half mirror 205, and a photosensor 204 for sensing the converged light.

The laser diode 201 is a laser diode which can emit infrared rays having a wave length of 890 nm although one emitting a visible-light laser may be used. There are advantages of using the infrared rays. For example, the infrared rays can be used even in a dark conference room or similar situations and also that user's attention is not diverted to the visible-light laser emitted from the light source. However, it is required to use appropriate wave length and light-emitting strength of the laser diode 201 to prevent the optical unit 101 from its getting too hot or from high probability of misidentification by catching other infrared rays in the light receiving section. It should be noted that using ultraviolet rays are not desirable because using ultraviolet rays for a long time may be bad for the human body.

A combination of appropriate lenses is used as the diffusing lens 202 as necessary. In the figure, a combination of flat concave lenses is used. Since two optical units 101 are used in principle in the coordinate-position input device 100, the diffusing lens 202 is required to diffuse the light by at least 90 degrees. It should be noted that any diffusing lens 202 may also be employed on condition that it diffuses light over 90 degrees in parallel with the writing surface of the white board 110 and at the same time only slightly diffuses the light in a normal direction with respect to the writing surface thereof. With this feature, even if the direction of light emitted from the light source is slightly displaced with respect to the frame body, the light is reflected by the reflecting members 103. This type of diffusion is effective especially in a large frame body.

The light-receiving lens 203 plays a roll of converging the reflected light passing through the half mirror 205 towards the photosensor 204. Convergence of the light by the light-receiving lens 203 increases the intensity of the light so that a case where light is detected can easily be discriminated from a case where light can not be detected (when light is not detected due to a blockage on the touch-panel surface).

The photosensor 204 senses the reflected light converged by the light-receiving lens 203 and detects a direction from which the reflected light can not be sensed. As a photosensor 204, there is a CCD line sensor as an example, and this sensor can detect the direction from which the reflected light can not be sensed. It should be noted that any photosensor 204 enabling detection of a direction from which reflected light can not be sensed may be used. A mode may be used in which a rotatable slit is provided in a section where reflected light is received on the optical unit 101 to recognize a direction from which incident light can not be sensed or the like.

The photosensor 204 should effectively sense a wave length of light with highest strength, so that the sensor may be selected by taking into consideration absorption and attenuation of light by an optical system because the light passes through various types of optical system. It is considered that light incident onto the photosensor 204 contain various types of noise other than the light emitted by the laser diode 201. Therefore, it is required to use a laser diode 201 which can emit light of such an intensity that the light finally passing through the light-receiving lens 203 can be differentiated from the noise. By using the light having the intensity as described, it is possible to detect the direction from which only light having an intensity as much as that of noise can be sensed as a direction in which a blocked point is present on the touch-panel surface.

As a method of enhancing the sensing precision of the photosensor 204, there is also a method of, other than the method of making light-emitting power of the laser diode 201 higher, letting the reflected light of specified intensity into the photosensor 204 by providing a filter immediately ahead of the photosensor 203 without bothering the reflecting direction.

A device emitting a fan-shaped light flux is used as the optical unit 101. However, the optical unit 101 is not limited to the device described above, and there may be used an optical unit based on a type of scanning a touch-panel surface with a light beam by using, for instance, a rotating polygon mirror.

(Structure of the Mounting Member)

Figure 4A:
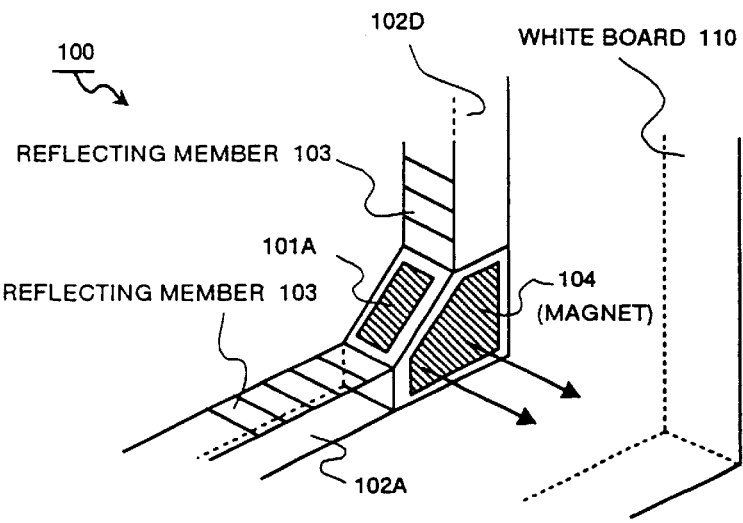
FIG. 4A to FIG. 4C are external views of the frame edge with a magnet, a hook, and a form capable of being hung each employed as a mounting member for the coordinate-position input device.
Figure 4B:
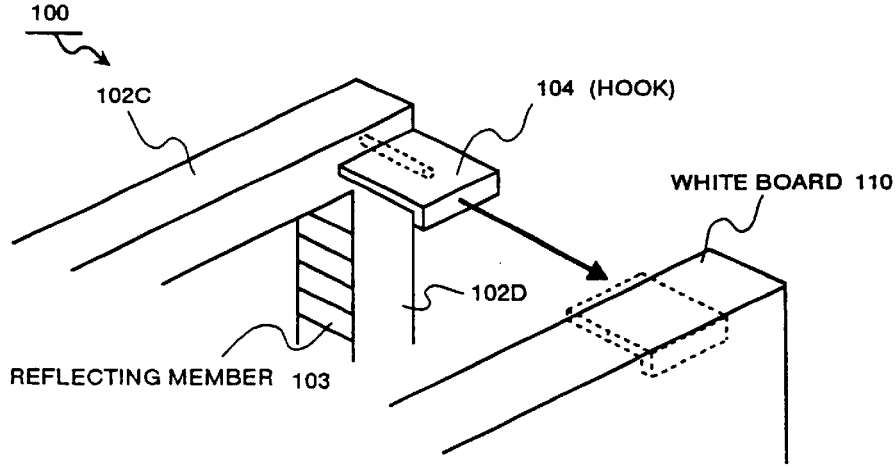
Figure 4C:
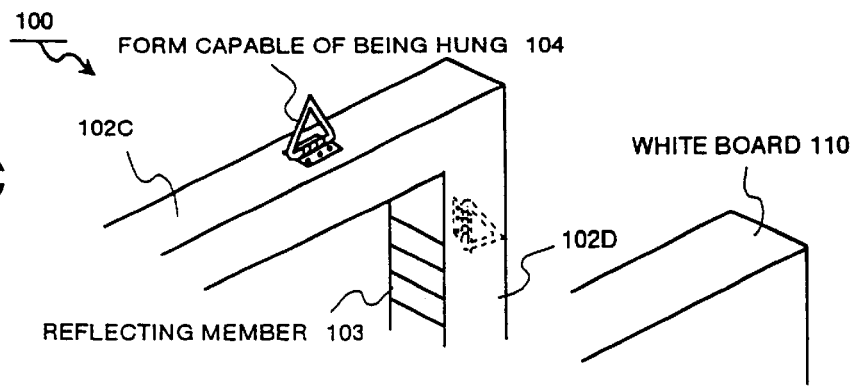

The mounting member 104 is made with any of a magnet, a hook, a form enabling hanging, a suction cup, a face-type fastener, an engaging form, and an adhesive or a combination thereof, and is provided with the frame body. FIG. 4A shows an external view of the frame edges when a magnet is employed as the mounting member, FIG. 4B shows an external view of the frame edges when a hook is employed as the mounting member, and FIG. 4C shows an external view of the frame edges when a form capable of being hung is employed as the mounting member for the coordinate-position input device 100. The coordinate-position input device 100 can easily be attached to the white board 110 and another component of display unit by one of these mounting members 104 with a simple structure or can fix a position of the white board with respect to other display unit.

The frame body can be mounted on the white board 110 in either the longitudinal direction or in the lateral direction thereof by one of these mounting members 104, so that mounting flexibility can be enhanced. The mounting member 104 (a hook) in FIG. 4B has a shaft in the center thereof and is rotatable around the shaft, so that the frame body can be mounted on the white board in either the longitudinal direction or the lateral direction thereof. Also the mounting members 104 (a form capable of being hung) in FIG. 4C are provided at both ends of each of the frame edges 102A to 102D, so that the frame body can also be mounted on the white board in either the longitudinal direction or the lateral direction thereof.

It should be noted that a positional relation between the frame body and the white board 110 may not necessarily be such that both of them come in contact with each other. That is because, there may be a case required for preventing the miss-entry of a coordinate position which miss-entry is caused due to deposit or adhering of powder of a chalk or dust generated when a writing with a pen is erased onto the reflecting member 103 when the frame body and the white board come in contact with each other. Also if the form capable of being hung is employed as a mounting member 104 and the frame body is hung from a ceiling, the coordinate-position input device 100 can be fixed to the existing white board 110 to which the coordinate-position input device 100 can not directly be attached.

Figure 5:
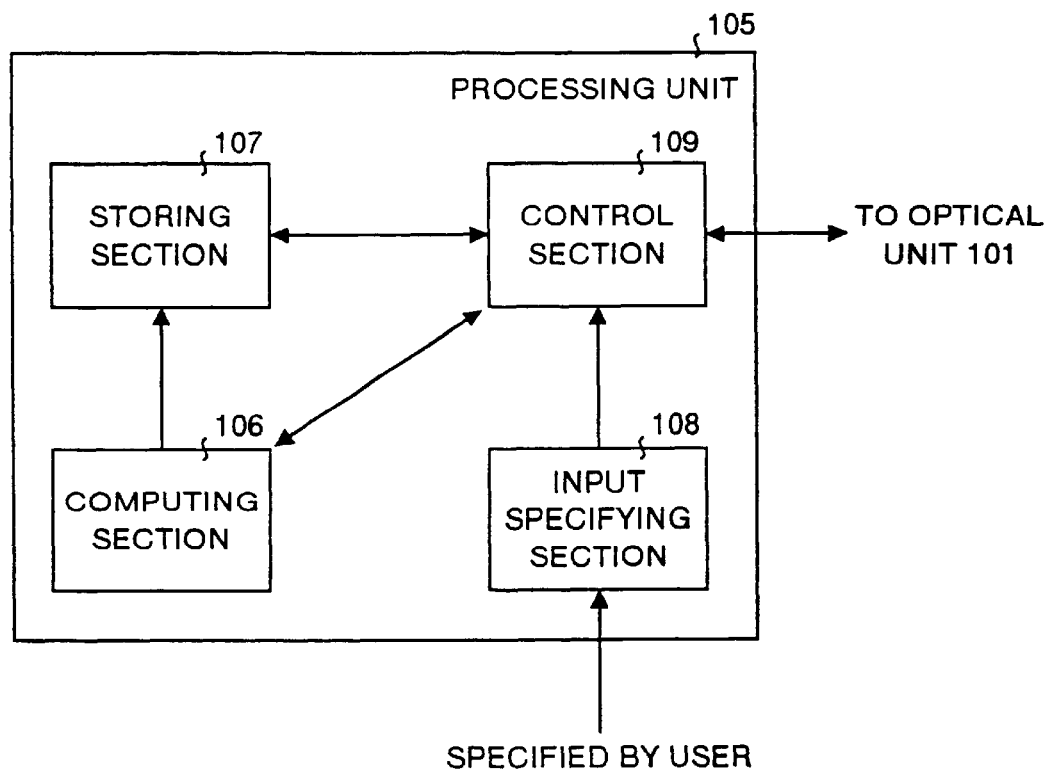
FIG. 5 is a block diagram showing a flow of coordinate-position input data among a computing section, a storing section, an input specifying section, and a control section as well as controls by the control section.

Next, the processing unit 105 comprising a computing section, a storing section, an input specifying section and a control section will be described. FIG. 5 is a block diagram showing a flow of coordinate-position input data among the computing section 106, storing section 107, input specifying section 108, and control section 109 in the processing unit 105 as well as controls by the control section. In the processing unit 105, the computing section 106 computes a coordinate position of a blocked point where light is blocked by the pen 120 used for writing on the white board 110 through the touch-panel surface from a direction from which reflected light can not be received by a light-receiving section as well as from a distance between the two light receiving sections. The storing section 107 stores therein the computed coordinate position. With the input specifying section 108, whether a coordinate position is to be inputted or not can be selected. The control section 109 provides controls over the optical unit 101 and computing section 106 according to specification by the input specifying section 108.

(Configuration of the Computing Section)

The computing section 106 computes a coordinate position of the blocked point from a distance between the light receiving sections and the direction from which light can not be sensed by the light receiving section due to a blocked point on the touch-panel surface blocked by the pen 120. If required, the computing section 106 also converts the computed coordinate position to an integer value as a grid value of the display surface. At first, a principle of computing a position of a blocked point will be described.

Figure 6:
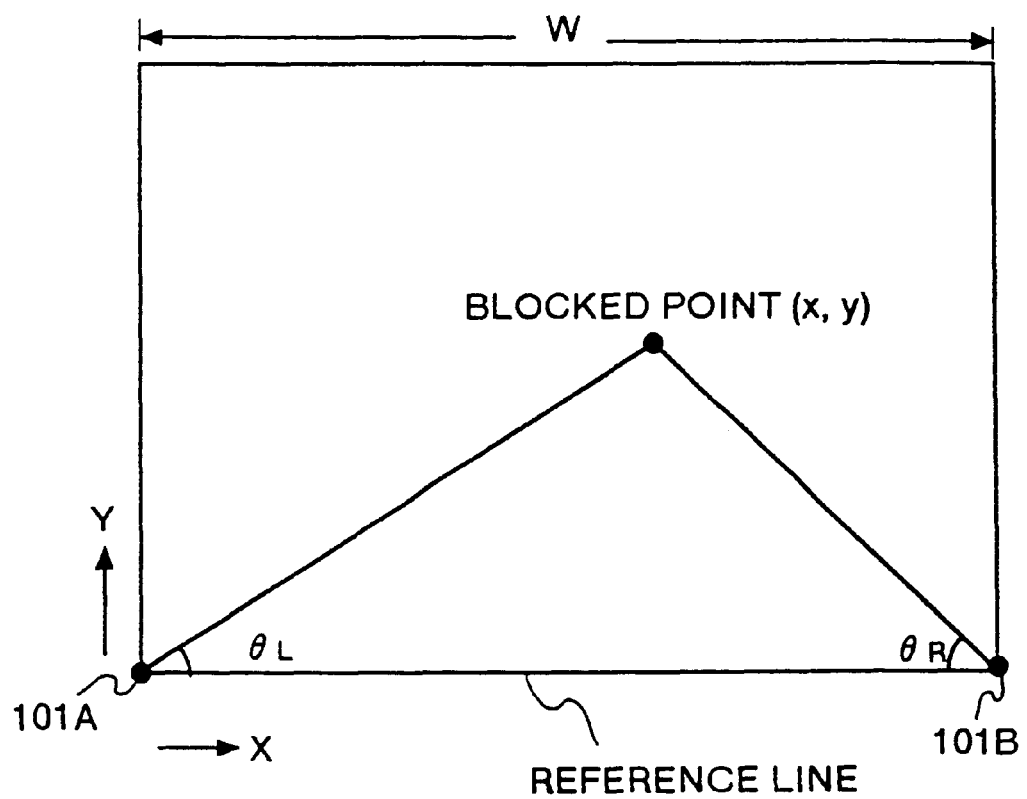
FIG. 6 explains a positional relation for computing a blocked point on the touch-panel surface.

FIG. 6 is an explanatory view for explaining a positional relation for computing a blocked point on the touch-panel surface. It should be noted that the explanation is the same as that described with respect to above Equation (1) for obtaining a point on the optical axis.

Namely, when coordinate values are set as shown in the figure, a blocked point, namely a position (x, y) written with a pen 120 on the white board 110 is uniquely expressed as follows assuming that a distance between the light receiving section of the optical unit 101A and the light receiving section of the optical unit 101B is W and angles each between each of the light receiving sections and a reference line (a line linking the two light receiving sections) are $\theta_L$ and $\theta_R$:

$$x_p = (W \cdot \tan \theta_R)/(\tan \theta_L + \tan \theta_R)$$

$$y_p = x_p \cdot \tan \theta_L$$

The coordinate of the blocked point (x, y) computed using the above equation is generally a number with a decimal point. If this computation is executed in single precision or double precision in the computing section 106, a high-precision coordinate position can be obtained. However, processing of computation with a decimal point takes long time, which increase the load onto the computing section 106. On the other hand, coordinate position data to be stored in the storing section 107 described later does not also require an accurate value with a decimal point on condition that the data is provided for the purpose that contents written on the white board 110 can be stored so as to be capable of easily interpreting them.

When an accurate coordinate position is not required as described above, it is simple and convenient that virtual x axis and y axis and a virtual grid, for instance, a grid with resolution of XGA (1024×768) are provided on the touch-panel surface of the coordinate-position input device 100. Further, a blocked point (x, y) is once computed, and then the computed values are replaced with a corresponding integer value on the grid, and that the processing thereafter (e.g., processing of storing the value in the storing section 107) is executed.

(Configuration of the Storing Section)

Figure 7A:
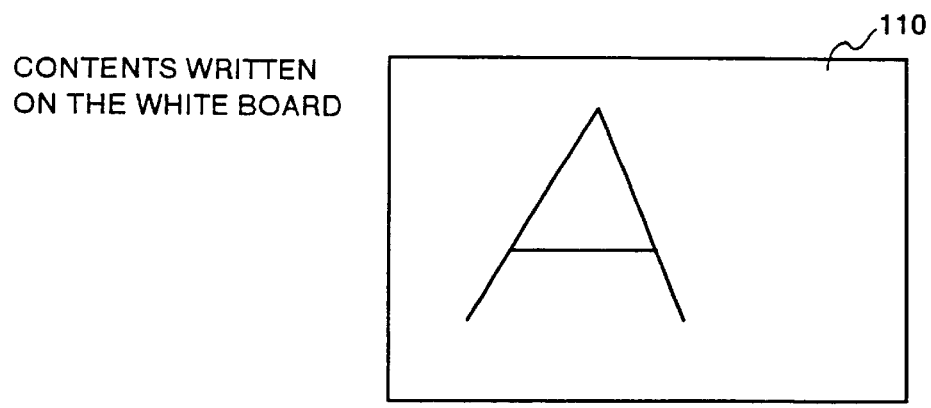
FIG. 7A and FIG. 7B show contents written on a white board and how the contents are stored in a frame memory.
Figure 7B:
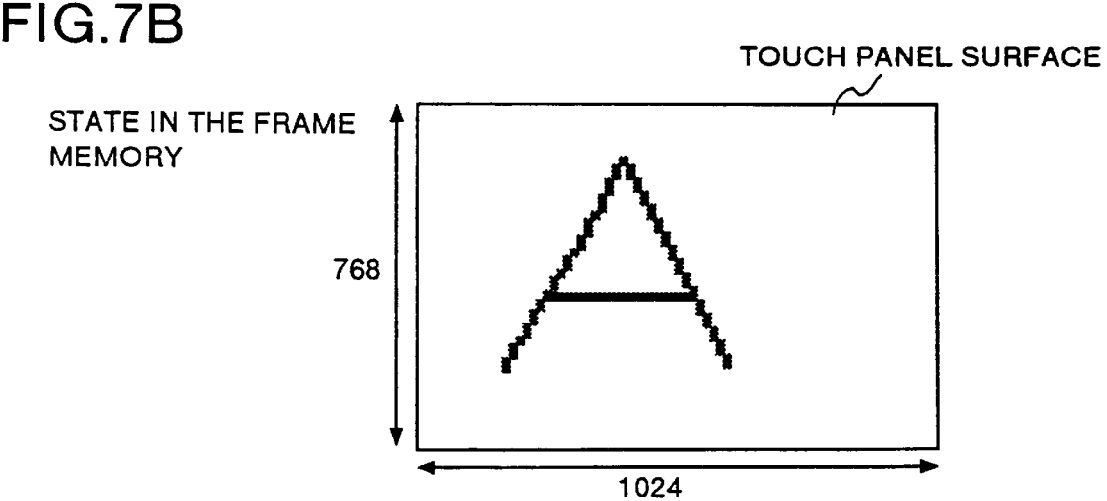

The storing section 107 stores therein a coordinate position computed by the computing section 106. When a coordinate position is replaced with a grid value, as each point is indicated by 1 bit assuming that a blocked position (in reverse video) is 1 and a not blocked position (in normal video or not displayed) is 0, there are 1024×768=786432 bits displayed based on the XGA, and so the storing section 107 can store therein information for a full screen as frame memory with less than 100 Kbytes. FIG. 7A shows contents written on the white board 110 and FIG. 7B shows how the contents are stored in the frame memory.

The storing section 107 can store therein a locus of a blocked point not as frame memory but as time-varying histories. In such a case, a recording time is decided by updating intervals of the frame and storage capacity, and so image information for 90 minutes can be stored in a 540 M-storage medium even if, for instance, one frame is stored at one second intervals.

As a manner of storage, data may be stored in an entirely non-compressed form like BMP file or may be stored in a compressed form like a JPEG or GIF format. In order to leave histories with time, a general-purpose storage form such as a form of AVI file is employed.

A storage medium employed as the storing section 107 includes a general-purpose storage medium such as a floppy disk, a card memory (an ATA flash-memory card, a compact flash card, PCMCIA hard disk card or the like), a CD-RW, and a DVD. A processing unit 105 which can use a PCMCIA type II of card is utilized in the coordinate-position input device 100 shown in FIG. 1. When the storing section 107 is provided in the coordinate-position input device 100, contents of the white board 110 can be recorded without using any special external equipment. Using the general-purpose storage medium means employment of the general-purpose equipment for an interface device, and with this feature, the storage medium is detached from the processing unit 105, which allows the image information to be printed by using another external equipment such as a personal computer and historical data on drawing can be reproduced like a movie.

(Configuration of the Input Specifying Section and the Control Section)

The input specifying section 108 exclusively specifies any of the coordinate-position input mode for inputting a coordinate position through the touch-panel surface and the input suspend mode for not inputting a coordinate position. This is required to prevent such inconvenience that when drawn contents on the white board 110 are erased with an eraser for a blackboard and if the light receiving section detects the eraser as a blocked point as it is, the drawing drawn so far is filled in with black. By using the exclusive specification when recording in the frame memory is started anew, contents described on the white board 110 can be stored for each drawn-contents break.

The control section 109 provides controls over at least one of the optical unit 101 and computing section 106 to control processing whether a coordinate position is to be inputted or not. Other than this control, the control section 109 provides controls for input or output of a general-purpose storage medium.

In the coordinate-position input device 100 in Embodiment 1, the frame body with the integrated optical unit 101 can easily and detachably be attached to existing white board 110 or a display unit by means of the mounting member 104 provided on the frame body. It is possible to store characters and graphics drawn on the writing surface of the white board 110 or the display surface of the display unit in a general-purpose storage medium so as to be readable, and easily print (record) the contents without copying the contents by hand which is troublesome to the user.

In the coordinate-position input device in Embodiment 2, frame edges which form the frame body are extendable in multi-steps in addition to the feature that the device can detachably be attached to a white board or a display unit with the help of a mounting member. It should be noted in Embodiment 2 only those points which are different as compared to Embodiment 1 will be described unless otherwise specified. Further, same names and reference numbers are used for the sections which have same or similar functions as those in Embodiment 1.

Figure 8:
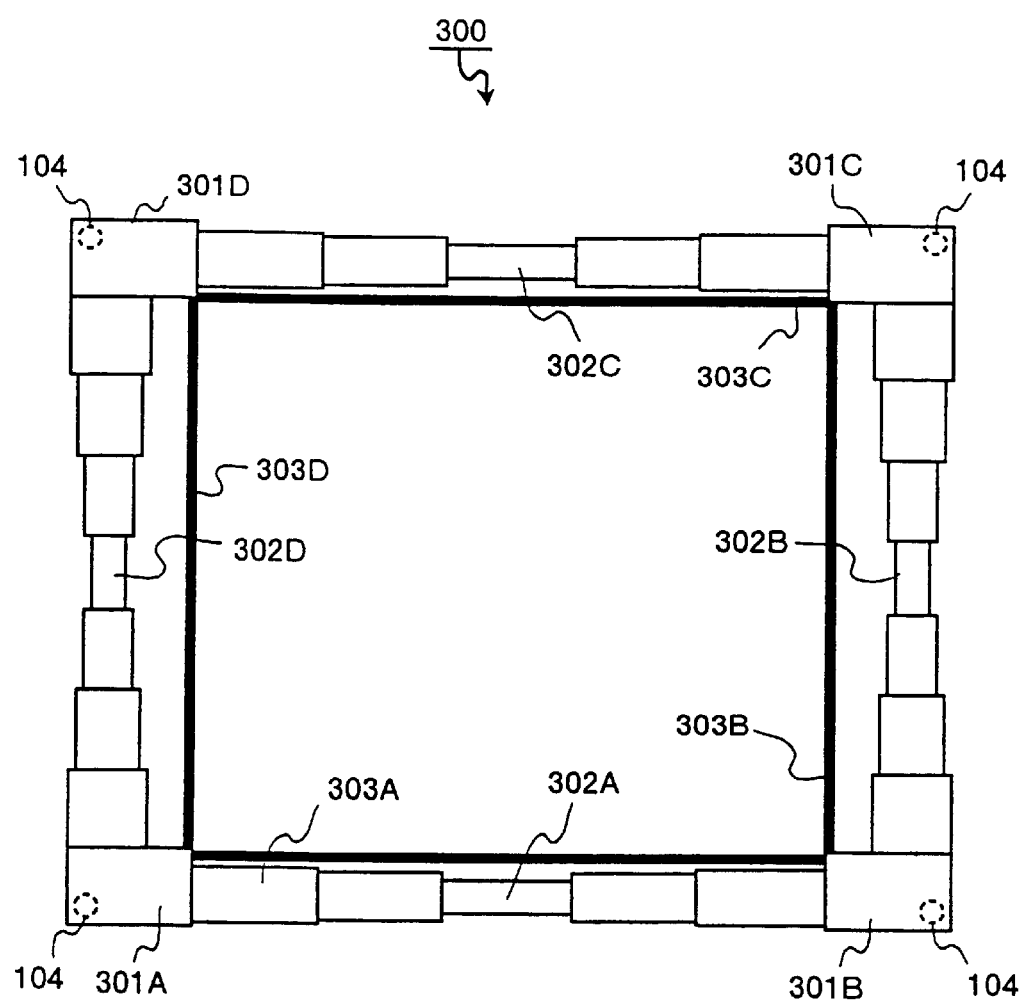
FIG. 8 is an external view showing appearance of the frame and reflecting members of the coordinate-position input device.

FIG. 8 is an external view showing appearance of the frame and reflecting members of the coordinate-position input device according to Embodiment 2. Frame edges 302A to 302D which form the frame body of the coordinate-position input device 300 have a nesting structure. The frame edges 302A to 302D as well as reflecting members 303A to 303D are accommodated in frame-ends sections 301A to 301D respectively. Since the frame edges 302A to 302D are extendable in a multi-step, the size of the coordinate-position input device 300 can be changed according to the size of the white board or the display unit to be used. The mounting members 104 are provided on each of the frame-ends sections 301A to 301D. With these mounting members 104 the device can be attached to the white board or the display unit. It should be noted that, the term 'frame-ends section 301' will be used hereinafter to indicate collectively the frame-ends sections 301A to 301D, and the term 'reflecting member 303' will be used hereinafter to indicate collectively the reflecting members 303A to 303D.

Figure 9:
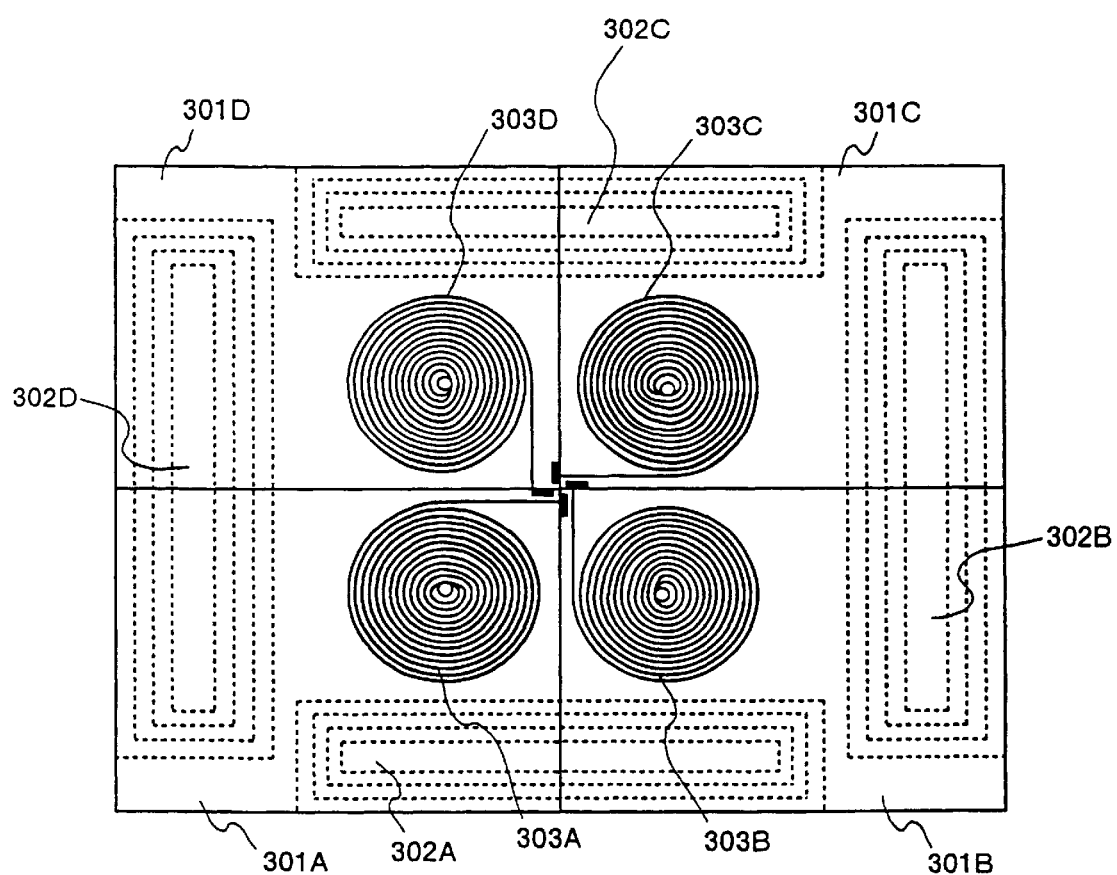
FIG. 9 is a general view showing a general configuration of the coordinate-position input device which forms an outside shape with only the frame-ends sections obtained by accommodating the entire reflecting members and frame edges therein.

The reflecting member 303 used in the coordinate-position input device 300 is made with a reflective tape having the property of recursively reflecting the incident light similarly to that of the above described corner cube array. The reflecting member 303 can be wound into a roll and accommodated in the frame-ends sections 301A to 301D. FIG. 9 shows a general configuration of the coordinate-position input device 300 which has an outer shape of the frame-ends section 301 when the all the reflecting members 303A to 303D as well as the frame edges 302A to 302D are accommodated therein. The optical unit 101 or the like is omitted in this figure because the figure is intended only to show how the reflecting members 303A to 303D and the frame edges 302A to 302D are accommodated in the frame-ends section 301.

A spring or the like is provided in the center of each roll although it is not shown in the figure, and the reflecting members 303A to 303D are stretched each with the tension maintained constant regardless of the size of a frame body. The coordinate-position input device 300 can be used in accordance with the size of a white board or a display unit to be used because its frame edges 302A to 302D are extendable in multi-steps, and in addition, its accommodation, transportation, and installation or the like can easily be realized.

In FIG. 8 and FIG. 9, the reflecting members 303A to 303D and the frame edges 302A to 302D are separated from each other. However, a reflective tape may be adhered on the inner side of the frame edges 302A to 302D or a corner cube array may be integrated thereto in the same manner as that in Embodiment 1. When the recursive reflectivity of the reflective tape is low, then an optical unit for irradiating a light beam by using a rotating polygon mirror may be used.

Figure 10:
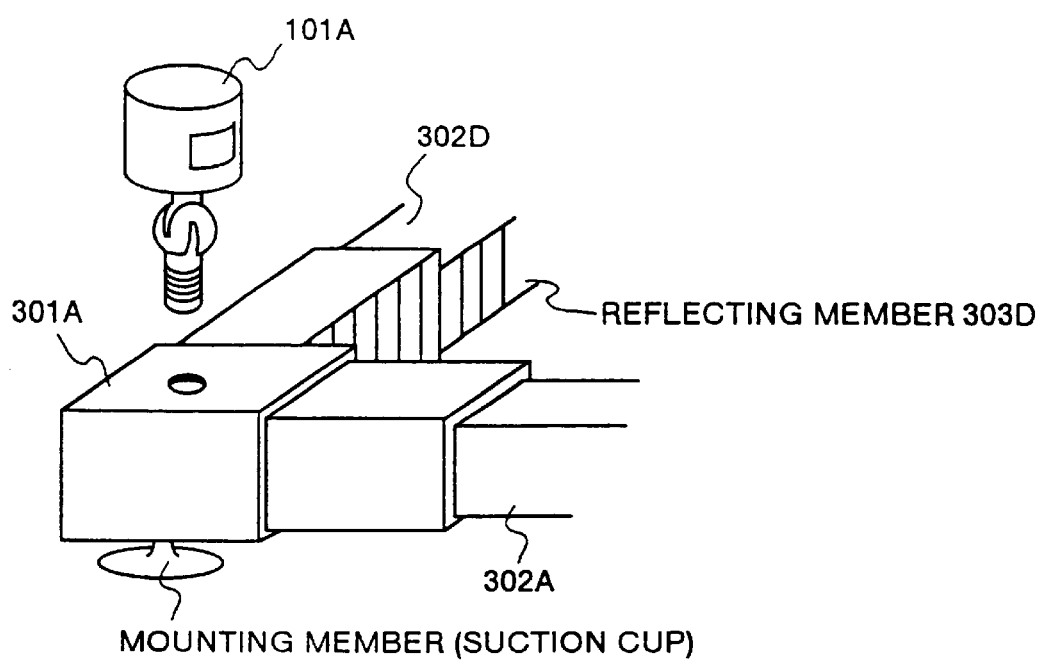
FIG. 10 is an external view showing appearance of an attachment structure between the detachable optical unit and the frame-ends section.

The optical unit 101 of the coordinate-position input device 300 can detachably be attached to the frame-ends section 301 with an irradiating direction of light from the optical unit 101 adjustable. FIG. 10 shows an attachment structure for attaching the detachable optical unit 101A to the frame-ends section 301A. In this figure, the optical unit 101A and the frame-ends section 301A are attached to each other with a screw. A universal joint (hook joint) is provided on the upper side of the screw of the optical unit 101A so that light can be irradiated in any direction. It should be noted that a detachable structure of the optical unit is not limited to the screw, and any structure may be employed on condition that the optical unit is detachably fixed to the frame-ends section. A structure for adjusting the irradiating direction of light from the optical unit is not limited to the universal joint, and any structure may be employed on condition that the optical unit can be directed in any direction and fixed. Also in this figure, the optical unit 101A is attached on the outside of the frame-ends section 301A, but a structure in which the optical unit is attached inside the frame-ends section 301A may be allowable.

Figure 11A:
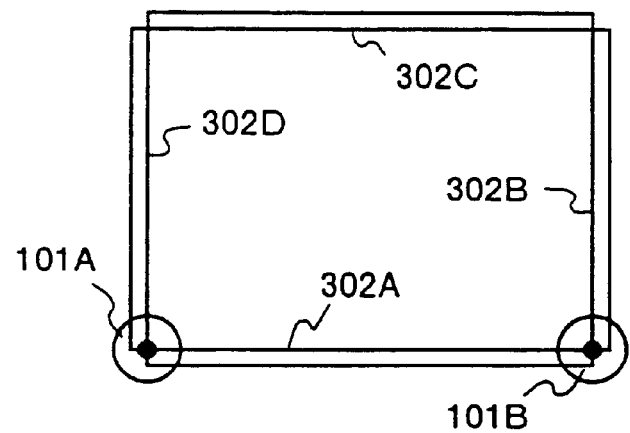
FIG. 11A and FIG. 11B explain examples of locations where the optical units can be attached.
Figure 11B:
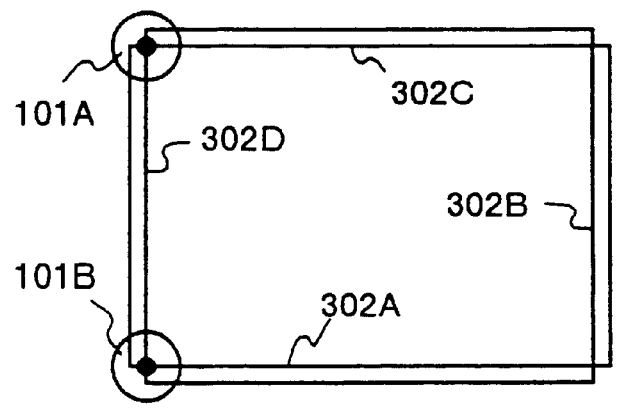

Screw holes are provided at all of the frame-ends sections 301A to 301D, and so optical units can be attached to any adjacent frame-ends sections 301. FIG. 11A and FIG. 11B show examples of locations where the optical units 101A and 101B may be attached. For example, as for the locations for their attachment shown in FIG. 11A, a frame edge not particularly requiring reflection is a bottom edge, so that there is comparatively a lesser chance of occurrence of reflection failure due to chalk powder or the like. In the locations for their attachment shown in FIG. 11B, there is less probability of occurrence of a case that the light receiving section may misidentify light when sun-light or the like enters a display surface from the left side thereof.

By designing the optical unit 101 in such a way that it can be detachably attached to the frame-ends section 301, the optical unit 101 can be fixed to any of the four frame-ends sections 301 and fixed in any of directions. Therefore, flexibility required when the coordinate-position input device 300 is fixed to the white board 110 is enhanced, which makes it possible to adjust the irradiating direction of light so as to obtain the most appropriate reflective intensity.

Figure 12A:
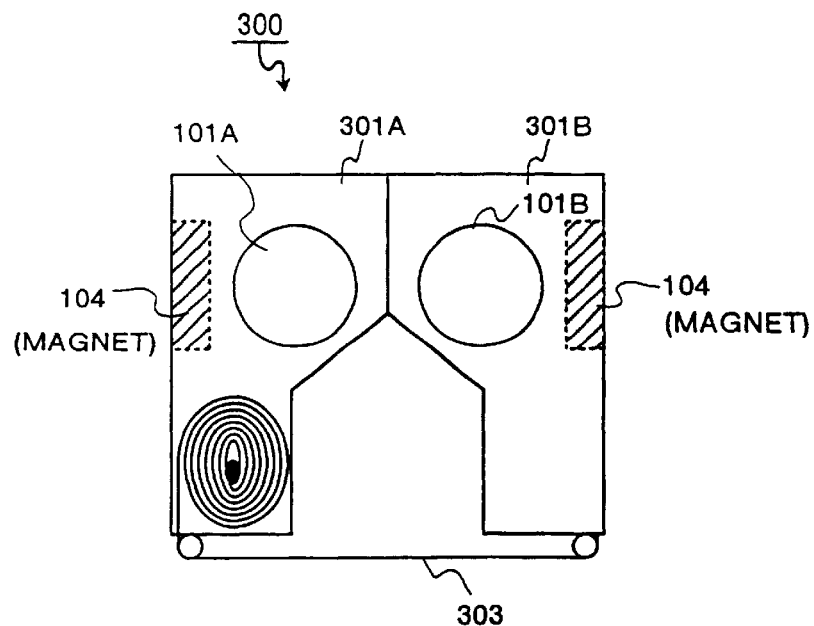
FIG. 12A and FIG. 12B show external configuration of the coordinate-position input device with reflecting members accommodated in the optical unit and appearance when the device is used respectively.
Figure 12B:
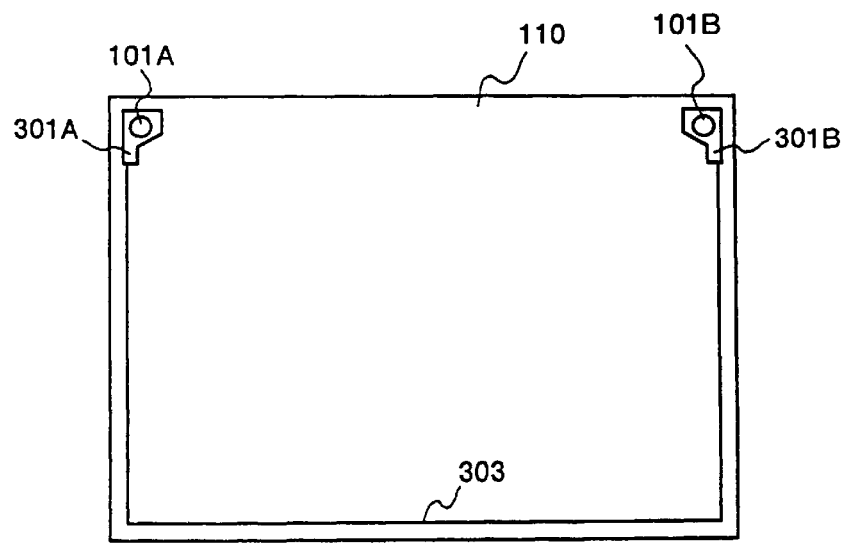

The coordinate-position input device 300 may also have a structure in which the reflecting member 303 is directly accommodated in the optical unit 101. FIG. 12A and FIG. 2B show external configuration of the coordinate-position input device 300 with the reflecting member 303 accommodated in the optical unit 101 and appearance when the device is used. FIG. 12A is an external view of the coordinate-position input device 300 when the entire reflecting member 303 is accommodated therein, and FIG. 12B is a view showing how the coordinate-position input device 300 is attached to the white board 110 to be used. In this case, a tape or a wire reflecting member 303 is used. However, it is required to support, by providing corners as necessary when the member is used, the member so as to surround the full surface of the white board 110. A magnet is used herein as the mounting member 104.

In the coordinate-position input device 300 in Embodiment 2, as the mounting members 104 are provided, the optical unit 101 and frame body can be easily and detachably attached to an existing white board 110 or a display unit. As the optical unit 101 is detachably attached to the frame body with an irradiating direction of light therefrom adjustable, the user can select any location which has a high precision of detecting a coordinate position. Further, as the frame edges 302A to 302D which form the frame body of the coordinate-position input device 300 are extendable, the coordinate-position input device can be used in accordance with the size of a white board or a display unit to be used, so that general versatility is enhanced.

Figure 13:
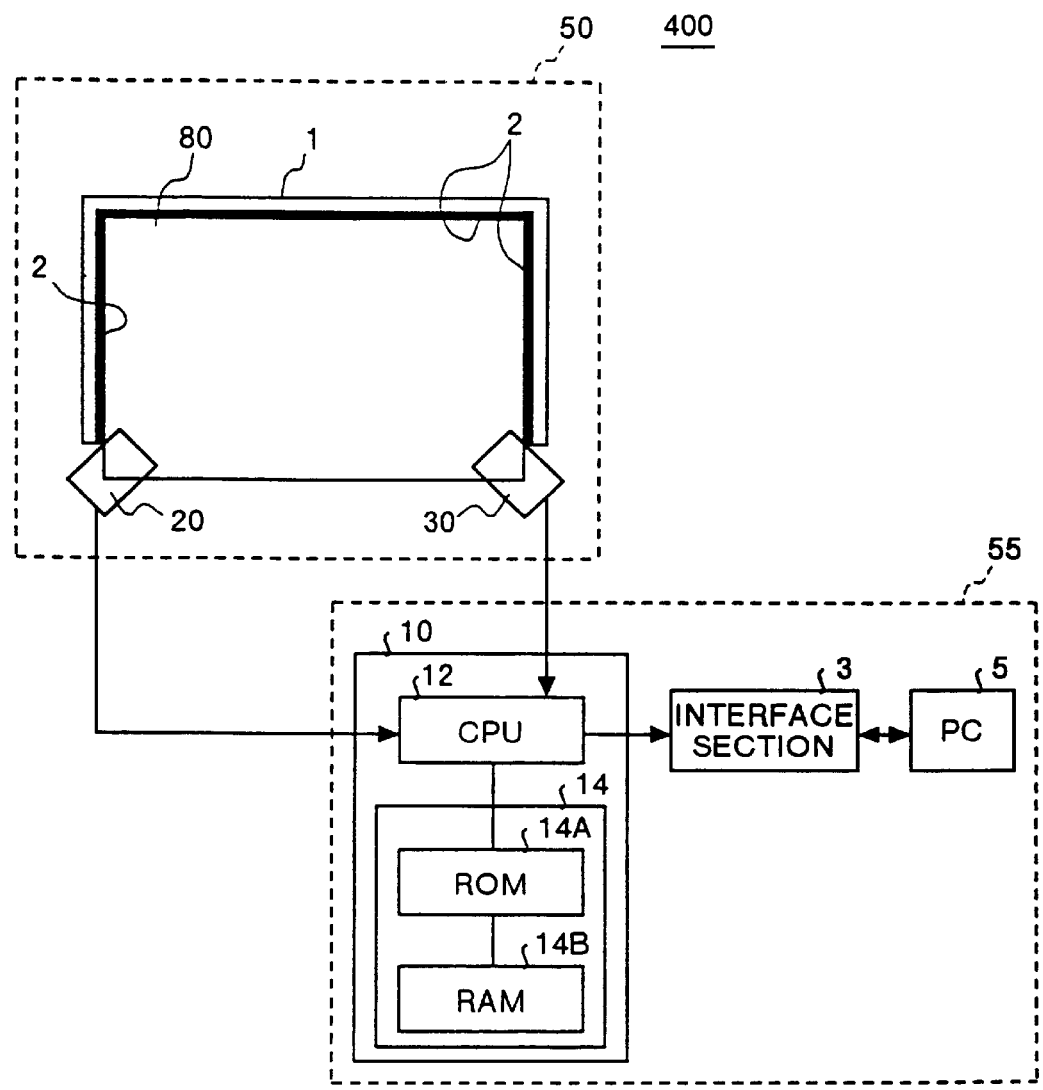
FIG. 13 is a block diagram for explaining the coordinate-position input device commonly used in Embodiments 3 and 4 of the present invention.

FIG. 13 is a block diagram of the coordinate-position input device according to Embodiments 3 to 5 of the present invention. The coordinate-position input device 400 shown in this figure is largely divided into an input section 50 with a character or an image by handwriting inputted therein, and a control section 55 for providing controls for processing or the like related to detection of a character or so inputted into the input section 50.

The input section 50 has a panel 80 such as a panel for defining an input area, an optical unit 20 and an optical unit 30 each for emitting light to the panel 80. A frame body 1 is provided on three sides of the panel 80, and a reflecting member 2 such as a reflective tape for reflecting light emitted from the optical units 20 and 30 is attached on the inner side of the frame body 1 (surface towards the panel) so as to reflect the light emitted from the optical units 20 and 30 along the same optical axis as that on its emission.

It should be noted that each of the optical unit 20 and optical unit 30 is formed by integrating a light source 21 (Refer to FIG. 14A and FIG. 14B) for emitting light flux over a substantially entire area of the panel 80 and a CCD line sensor 29 (Refer to FIG. 14A and FIG. 14B) as a light detecting unit for detecting the reflected light of the light emitted from the light source. The structure of this type of optical unit 20 and optical unit 30 will be explained later.

On the other hand, the control section 55 has a control unit 10, a personal computer 5 (abbreviated as PC hereinafter) connected to the control unit 10 and functioning as an operating section for inputting an instruction to the control unit 10, and an interface section 3 for outputting a signal from the control unit 10 to the PC 5. Further, the control unit 10 has a CPU 12 and a storing section 14.

A signal outputted from the CCD line sensor 29 provided in each of the optical unit 20 and optical unit 30 and is input into the CPU 12 where a position of a blockage such as due to a pen tip is calculated through computation based on this signal. The storing section 14 comprises a ROM 14A for storing therein data required for computing in the CPU 12 and a RAM 12B for successively storing positions of the blockage obtained by the CPU 12.

Figure 14A:
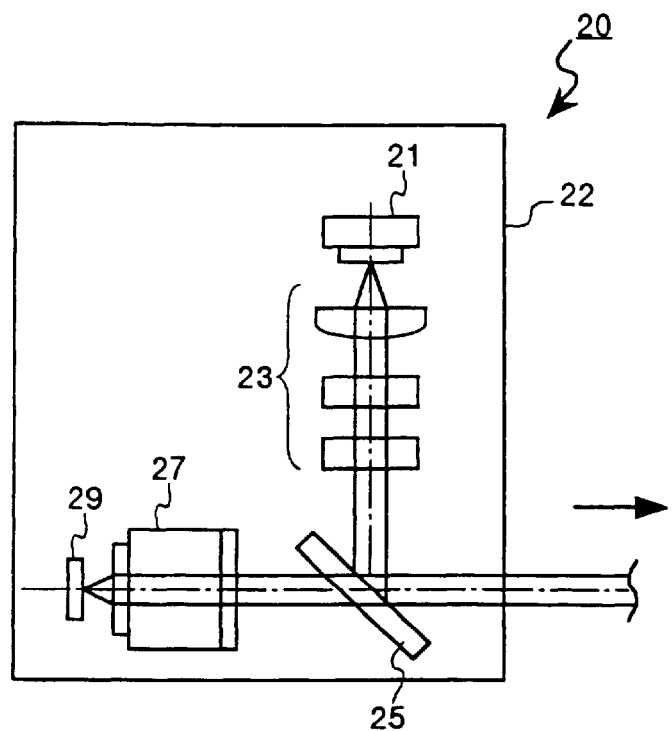
FIGS. 14A and 14B explain the structure of the optical unit in FIGS. 13.
Figure 14B:
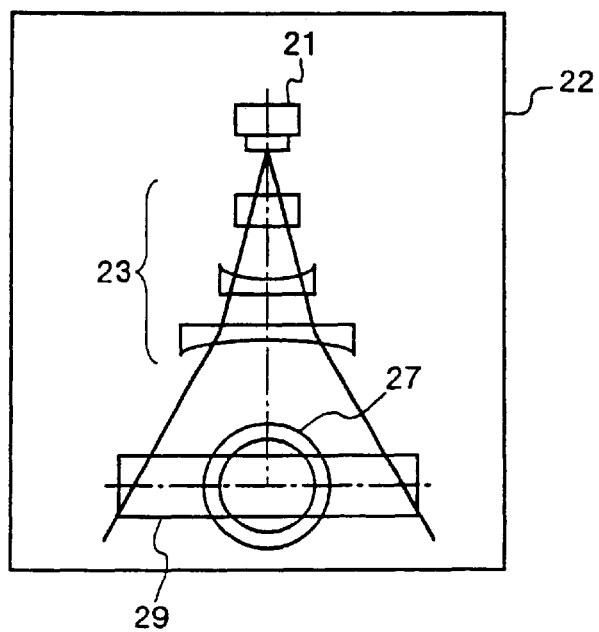

FIG. 14A and FIG. 14B are views for explaining the structure of the optical units 20 and 30, and FIG. 14A is a side view of each of the optical units 20 and 30 and FIG. 14B is a front view thereof (a surface from which light is emitted). It should be noted that the optical unit 20 and optical unit 30 are a pair of units each having the same structure. Therefore, only the optical unit 20 attached to the left side of the panel 80 in FIG. 13 will be described with reference to FIG. 14A and FIG. 14B. Namely, the optical unit 30 is not shown in these figures and description thereof is also omitted herein.

The optical unit 20 comprises a light source 21 for outputting a light beam, a lens section 23 for diffusing the light emitted from the light source 21, a lens section 27 for converging the reflected light of the light converged in the lens section 23, a CCD line sensor 29 for sensing the light converged in the lens section 17, and a half mirror 25 for reflecting the emitted light to the panel 80 and also passing therethrough reflected light to the lens section 27. All the members described above are fixed in a case body 22 and are integrated into one unit.

The light beam outputted from the light source 21 is diffused in the lens section 23 in a direction perpendicular to the optical axis of the beam, then the light beam is reflected by the half mirror 25 towards the panel 80 and finally emitted to the outside of the case body 22. As a result, a fan shaped light flux spreads at an emission port (not shown herein) as a pivot provided in the case body 22. Then, the light irradiated onto the panel 80 is reflected by the reflecting member 2 provided on the sides of the panel 80. When reflecting the light, the reflecting member 2 reflects all the light beams forming the fan-shaped light flux so that the beams are reflected along the same direction as the optical axis on their emission. Therefore, all the light beams return to the case body 22 and are converged by passing through the half mirror 25, and finally they are detected by the CCD line sensor 29.

In the optical unit 20 having the structure described above, if there is a obstacle on the panel 80 then the light is blocked by this obstacle and the light is not detected by the CCD line sensor 29. Therefore, if an element of the CCD line sensor 29 which does not receive the light can be detected, then the emission angle $\theta_L$ of the blocked light can be obtained from the position of this element. The emission angle $\theta_L$ Of the blocked light straightforwardly represents an angle of the axis where the obstacle exists. Consequently, if the other axis passing through a point where the obstacle exists is obtained from a result of detection by the other optical unit 30 then the coordinates of a point where the obstacle exists can be obtained through computation as an intersection of the two axes.

Each of the optical unit 20 and optical unit 30 according to Embodiment 3 has the members (light source 21, lens section 23, half mirror 25, lens section 27, and CCD line sensor 29) for obtaining data used for detecting a coordinate position of an obstacle as described above all integrated into one unit. Therefore, a positional relation between the members such as the light source 21, lens section 23, half mirror 25, lens section 27, and CCD line sensor 29 can be maintained in a constant status at any time.

Therefore, if attachment or detachment of the light source 21 and CCD line sensor 29 to or from the panel 80 is carried out for each of the optical unit 20 and optical unit 30 as a whole, the need for alignment to make sure that central axes of the members are in the right place and each distance therebetween is correctly spaced is eliminated. It is also possible to prevent precision of detection before and after its attachment and detachment from its variation and to enhance reliability of a result of detection.

Further, in Embodiment 3, only once when each of the optical unit 20 and optical unit 30 is constructed, the members located on the inner side thereof may be aligned with each other with high precision. Therefore, the number of times of aligning the members used for detection of a blockage may be a minimum number, so that Embodiment 3 is easier to be applicable even to a method of alignment thereof which takes a comparatively longer time.

Figure 15A:
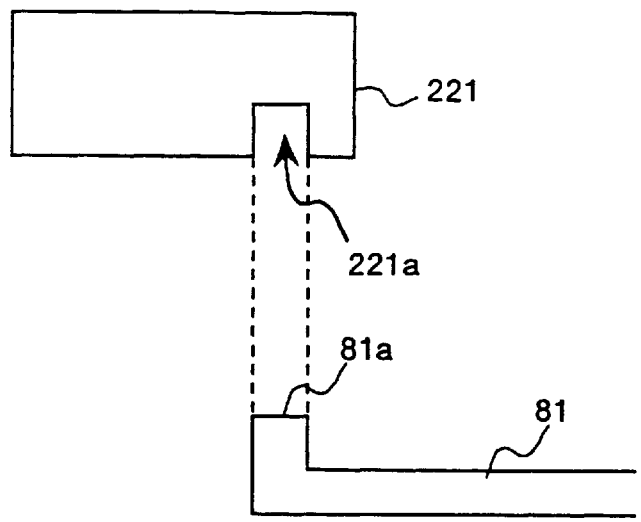
FIGS. 15A and 15B show examples of structures where an indexing mark in the side of an optical unit and an indexing mark in the side of a panel according to Embodiment 3 of the present invention are provided.
Figure 15B:
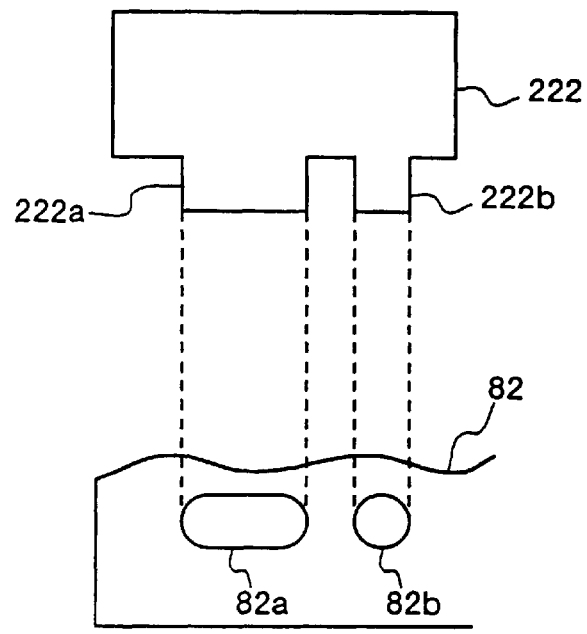

Next, alignment of the optical unit and the panel described above will be described. FIG. 15A and FIG. 15B are views showing examples of structures where an indexing mark is provided in the optical unit and an indexing mark is provided to the panel at a position where the optical unit is to be attached. In Embodiment 3, as it is required to irradiate fan-shaped light onto the panel, optical units are attached to corners of the panel where each angle of irradiating light is small so that the light can spread over the entire area of the panel.

FIG. 15A is a cross section of an optical unit 221 with a concave section 221*a* as an indexing mark provided therein, and a cross section a panel 81 with a convex section 81*a* as an indexing mark provided therein for engaging with the concave section 221*a* of the optical unit 221. The concave section 221*a* and the convex section 81*a* are formed so as to be coupled, and when the optical unit 221 is attached thereto, the convex section 81*a* is inserted into the concave section 221*a*. FIG. 15B shows a cross section of an optical unit 222 with a convex section 222*a* and a convex section 222*b* each as an indexing mark in the side of the optical unit provided thereon, and a top face of a panel 82 with a concave section 82*a* as a long hole and a concave section 82*b* as an ordinary hole each as an indexing mark in the panel side provided therein. The convex section 222a is formed so as to be coupled to the concave section 82a and the convex section 222b is formed so as to be coupled to the concave section 82b respectively. The indexing mark in the optical unit side and the indexing mark in the panel side shown in FIG. 15A and FIG. 15B are engaged in the corresponding marks when the optical unit is attached thereto, so that the optical unit can be attached to the panel in the right place.

In Embodiment 3 described above, precision of alignment between members can be enhanced by integrating a light source and a CCD line sensor into one unit, and precision of alignment of an optical unit to a panel can also be enhanced by providing indexing marks therein respectively. The structure in Embodiment 3 described above can prevent precision of detecting a blockage or reproduction of information from its variation due to attachment or detachment of the optical unit to or from the panel.

By the way, in recent years, a coordinate-position input device with an optical unit removable from a panel has been studied for the purpose of making the coordinate-position input device more transportable. The coordinate-position input device according to Embodiment 3 having the structure described above is preferably applied especially to this demanded coordinate-position input device.

The method of attaching the optical unit to the panel and adjusting the attached angle thereof will be described hereinafter.

Figure 16:
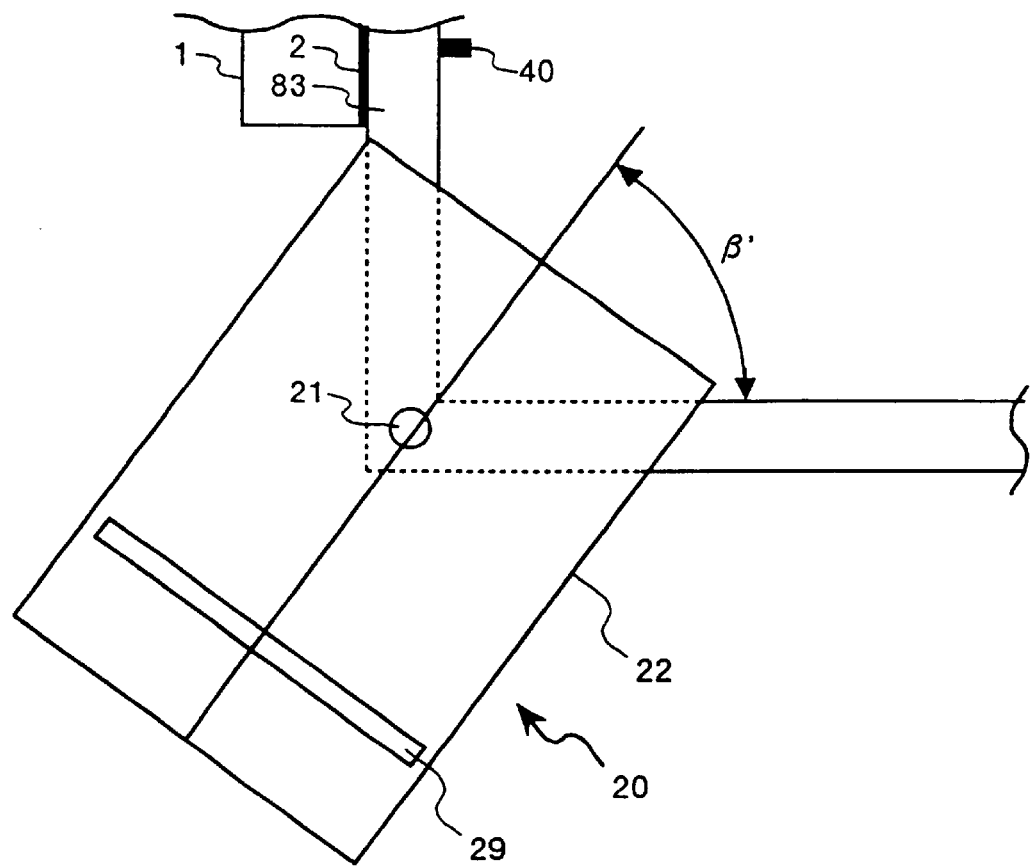
FIG. 16 explains a method of detecting the displacement of an optical-unit attached angle according to Embodiment 3 of the present invention.
Figure 17:
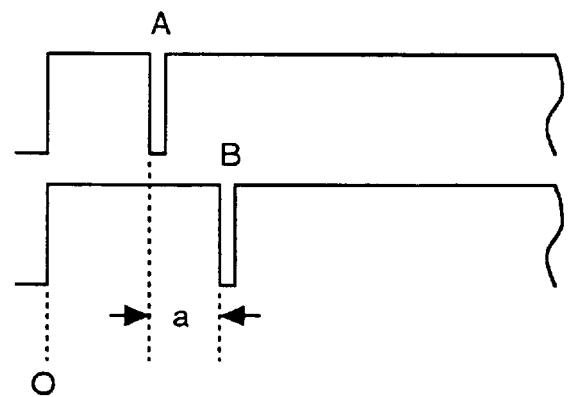
FIG. 17 is another view for explaining the method of detecting the displacement of an optical-unit attached angle according to Embodiment 3 of the present invention.

FIG. 16 and FIG. 17 are views each for explaining a method of detecting a displacement in the angle at which the optical unit is attached (optical-unit attached angle). FIG. 16 is a view showing a panel 83 having a detection mark 40 for detecting an optical-unit attached angle and an optical unit 20 attached to the panel 83 at its attached angle β'. The section of the panel 83 to which the optical unit 20 is attached is slightly thicker as compared to the section in the inner side thereof, which allows strength of the panel to be insured. In the optical unit 20 shown in the figure, a part of the figure to represent the incorporated members is omitted to make description simpler and only the CCD line sensor 29 and light source 21 are shown herein.

In the CCD line sensor 29, when the optical unit 20 is attached at an appropriate attached angle $β_L$, an element located in a specified location A detects the detection mark 40 as shown in FIG. 17, namely, the element is previously set so as not to detect light. When an attached angle of the optical unit 20 is displayed from the appropriate attached angle $β_L$, the detection mark 40 is detected by an element, for instance, at a location B displaced by a distance a from the element at the location A of the CCD line sensor 29.

Figure 18:
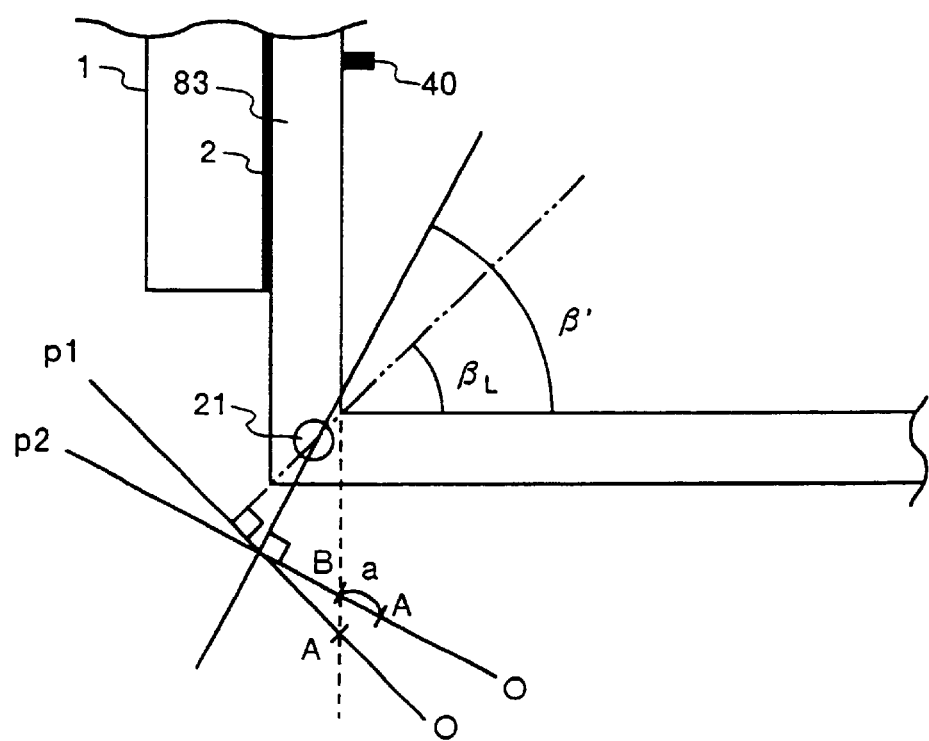
FIG. 18 is a view for more specifically explaining the displacement of an element for detecting a detection mark and displacement of an optical-unit attached angle according to Embodiment 3 of the present invention.

FIG. 18 is a view for more specifically explaining displacement of an element for detecting the detection mark 40 and displacement of an attached angle of the optical unit 20. When the optical unit 20 is attached to the panel at the appropriate attached angle $β_L$, it is assumed that the CCD line sensor 29 is located at the location p1 and detects the detection mark 40 with the help of the element at the location A. The CCD line sensor 29 described above moves, when the attached angle of the optical unit 20 is displaced from $β_L$ to β', to the location p2 in association with this displacement. Thus, the element which detected the detection mark 40 is shifted from the location A to the location B.

According to FIG. 18, the attached angle of the optical unit 20 corresponds to a location (detecting location) for detecting the detection mark 40 on the CCD line sensor 29 one-to-one, and the degree of displacement of attached angles (the angle $β_L$ as a reference) is proportional to the degree of displacement of detecting locations (the detecting location A corresponding to the angle $β_L$ as a reference). Accordingly, the relation as follows holds:

$$β'/β_L=(A+a)/A \quad (6)$$

However, the value of a is positive when an element detecting the detection mark 40 moves away from the location of O in the figure while the value of a is negative when the element moves closer to the location of O.

In Embodiment 3, for instance, the angle $β_L$, position A, and the equation (6) are previously stored in the ROM 14A of the control unit 55. Then, a result of detection in the CCD line sensor 29 is inputted into the CPU 12 and an actual attached angle β' is computed based on a location of the element detecting the detection mark 40 as (A+a). Equation (5) is corrected by using the computed value β' as an angle $β_L$ in Eq. (5). At this time, the location A of the element and the displacement rate a may be a number of elements based on the element at the location of O as a reference, or may be a value obtained by converting this number of elements to a distance.

In accordance with Embodiment 3, the displacement of the angle at which the optical unit is attached to the panel can be corrected through computation. Accordingly, emission angle can be computed accurately without requiring mechanical enhancement of attaching precision of the optical unit.

A series of processing performed in the coordinate-position input device according to Embodiment 3 will be described below with reference to a flow chart.

Figure 19:
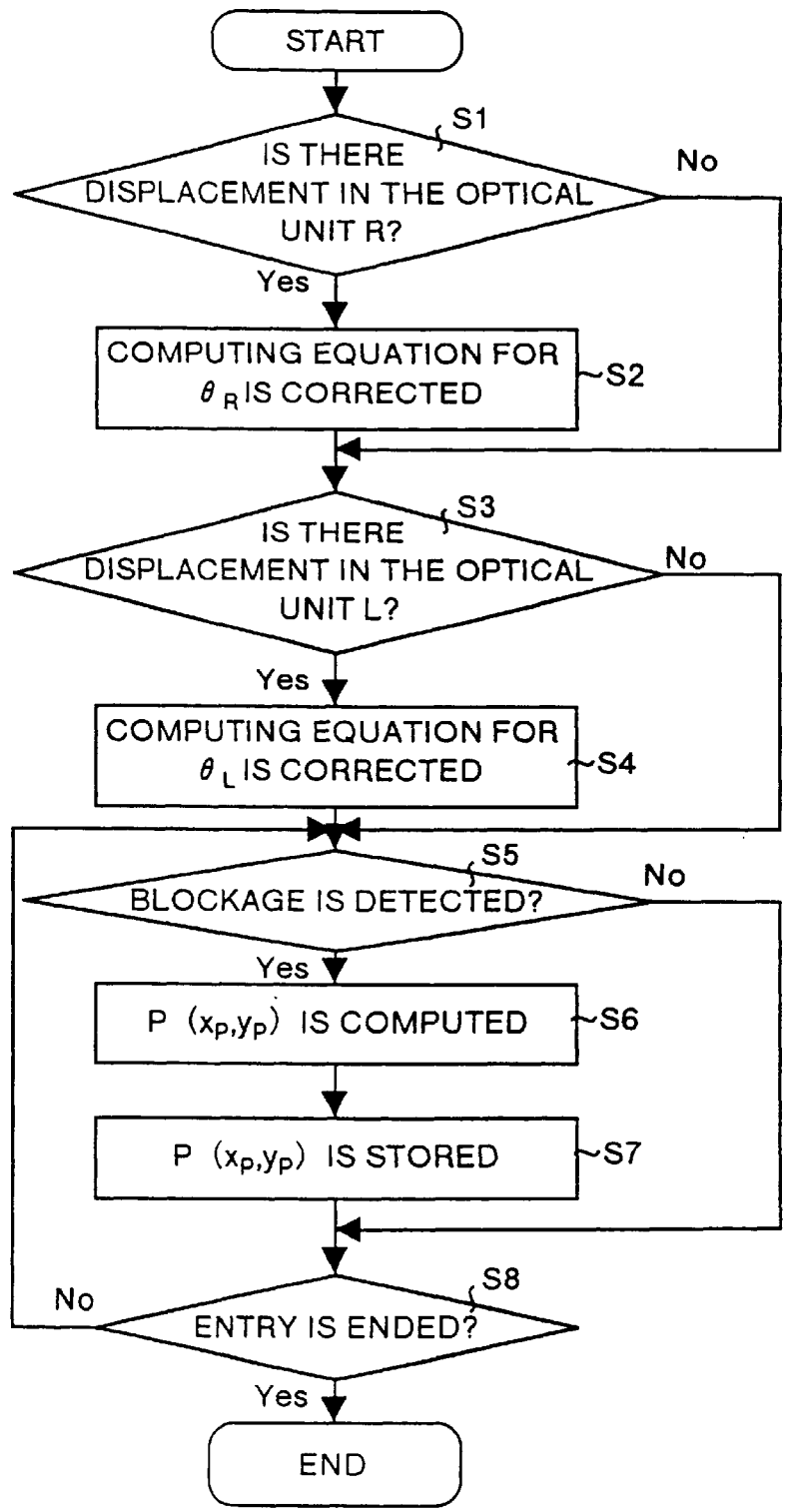
FIG. 19 is a flow chart for explaining the processing in Embodiment 3 of the present invention.

FIG. 19 is a flow chart for explaining the processing in the coordinate-position input device according to Embodiment 3. The processing shown in FIG. 19 is executed as follows. For instance, after an instruction to start the processing is inputted from PC 5, a result of detection in the CCD line sensor 29 is inputted from an optical unit R located, for instance, at the right corner of the panel 80, and whether there is any displacement in an attached angle of the optical unit R or not is determined (step S1). As a result of this, when it is determined that there is some displacement in the attached angle thereof (step S1: Yes), actual attached angle thereof is computed through the equation (6). Then, the equation (5) stored in the ROM 14A is read out onto the CPU 12, and the actual attached angle is substituted thereinto to correct the equation for computing emission angle $θ_R$ (step S2). At this point, the corrected equation may be stored in the RAM 14B as required.

Then, a result of detection in the CCD line sensor 29 is inputted from an optical unit L located at the left corner of the panel, and whether there is a displacement in an attached angle of the optical unit L or not is determined in the same manner as that in step S1 (step S3). As a result of this, when it is determined that there is a displacement in the attached angle thereof (step S3: Yes), equation (5) is read out onto the CPU 12, and the computed actual attached angle is substituted thereinto to correct the equation for computing the emission angle $θ_L$ (step S4). When it is determined in step S1 and step S3 that there is no displacement in the optical-unit attached angle, both the equations for computing the emission angles $θ_R$ and $θ_L$ stored in the ROM 14A are read out onto the CPU 12, and are applied without correction thereto to obtain the emission angles respectively.

Then, it is determined whether a blockage is detected or not (step S5), and when it is determined that the blockage is detected (step S5: Yes), a coordinate position ($x_p$, $y_p$) of the blockage is computed by using the equation in the CPU 12 (step S6), and this coordinate position is stored in, for instance, the RAM 14B (step S7). Then, it is determined whether or not an instruction to end the entry into the coordinate-position input device is given from the PC 5 or the like (step S8). When it is determined that such an instruction is not input (step S8: No), the processing is returned to the step where detection of a blockage is determined again (step S5). On the other hand, when it is determined that the instruction to end the entry is given thereto (step S8: Yes), the processing of the flow chart is ended.

It should be noted that the present invention is not limited to Embodiment 3 described above. In Embodiment 3, for instance, although the optical unit is directly attached to the panel, the unit may be attached thereto through a frame body. Also in Embodiment 3, although a CCD line sensor is used as a light detecting unit, the present invention is not limited to the configuration as described above, and any sensor may be employed on condition that the emission angle of the light which should have passed if the obstacle were not there can be determined from received reflected light.

Next, Embodiment 4 of the present invention will be described.

In Embodiment 4, tick marks are provided in the panel side so that the optical-unit attached angle can visually be read thereby and a user can input the read optical-unit attached angle through, for instance, the PC 5. Even in such a Embodiment 4, the CPU 12 corrects the equation used for computation when coordinates of a position of a blockage according to a difference between an inputted optical-unit attached angle and an attached angle at which the optical unit should be attached thereto.

Figure 20:
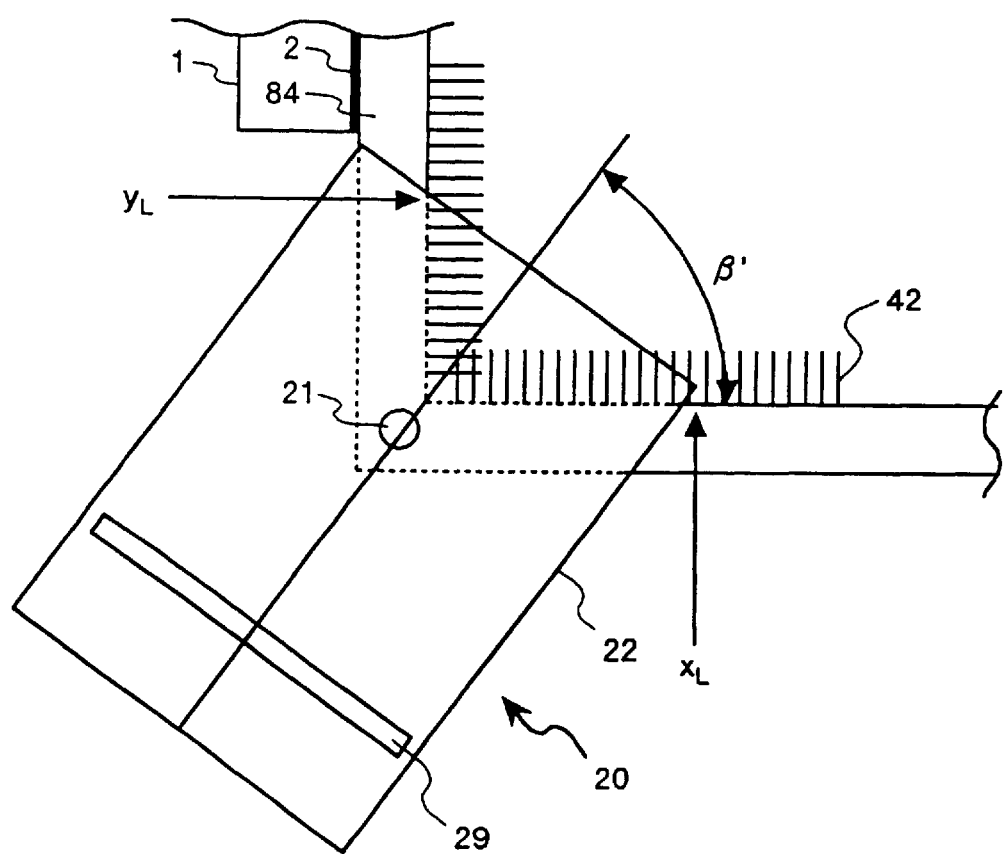
FIG. 20 is a view for explaining tick marks provided for reading an optical-unit attached angle according to Embodiment 4 of the present invention.

FIG. 20 is a view showing a panel 84 having a tick mark section 42 provided thereon for visually reading the optical-unit attached angle as well as shows the optical unit 20 attached to the panel 84 at an attached angle $\beta'$. It should be noted that, the optical unit 20 in FIG. 20 shows, in the same manner as the optical unit shown in FIG. 16, only the CCD line sensor 29 and the light source 21.

The tick mark section 42 has a scale $y_L$ with tick marks divided in the vertical direction and a scale $x_L$ with tick marks divided in the horizontal direction in the figure. With this tick mark section 42, the user can get to know displacement in the attached angle of the optical unit 20 with respect to the panel 84 from the tick marks on the scale $y_L$ and the scale $x_L$ each crossing the case body 22 of the optical unit 20.

Namely, in Embodiment 4, the reading of tick marks on the scale $y_L$ and scale $x_L$ when the optical unit 20 is attached to the panel 84 at an appropriate attached angle $\beta_L$ is previously stored, for instance, in the ROM 14A. Then, the user reads the actual tick marks on the scale $y_L$ and the scale $x_L$ and inputs the read values. The CPU 12 compares the tick marks on the scale $y_L$ and the scale $x_L$ stored in the ROM 14A to the inputted read values, and when the values are different therefrom, it is determined that a displacement has occurred in the attached angle of the optical unit 20. Then, the CPU 12 computes an actual attached angle $\beta'$ according to the stored tick marks and the read values, and employs the actual value in place of the value $\beta_L$ in equation (5) to compute the emission angle.

In Embodiment 4, with the configured as described above, it is possible to determine the displacement in the angle at which the optical unit 20 is attached to the panel 84 with simpler configuration as compared to that of detecting the detection mark 40 by the CCD line sensor 29. Thus, the invention according to Embodiment 4 can more easily correct the displacement in the attached angle of the optical unit 20 in addition to the effects obtained in Embodiment 3.

Next, Embodiment 5 of the present invention will be described.

In Embodiment 5, any of the coordinate-position input device according to the above described Embodiment 3 and Embodiment 4 can be employed as a coordinate-position input device for a display board system.

Figure 21:
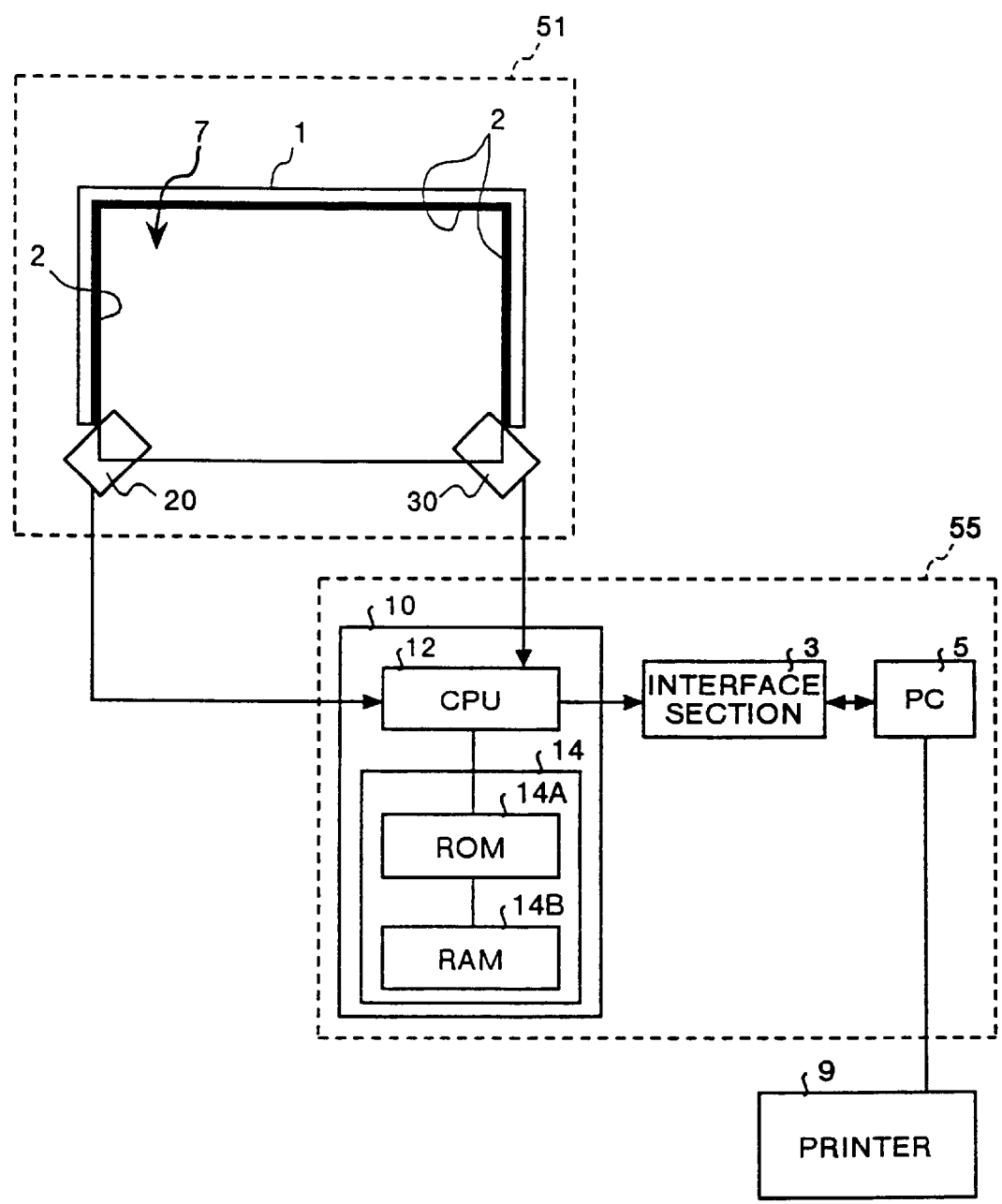
FIG. 21 is a block diagram for explaining the configuration of a display board system according to Embodiment 5 of the present invention.

FIG. 21 is a block diagram for explaining the configuration of a display board system according to Embodiment 5 of the present invention. The configuration shown in FIG. 21 is substantially the same as that shown in FIG. 13, so that the same reference numerals are assigned to the same configuration, and description thereof is omitted herein. The configuration shown in FIG. 21 is largely divided into an input section 51 from where a character or an image by handwriting can be inputted, and a control section 55 for providing controls for processing of detecting a character or so inputted into the input section 50 as well as of recording it. It should be noted that the input section 51 has a white board 7 provided in the back side of the panel 80 shown in FIG. 13. The control unit 55 is further connected to a printer 9 and can print the contents displayed on the white board 7 onto a paper.

Figure 22:
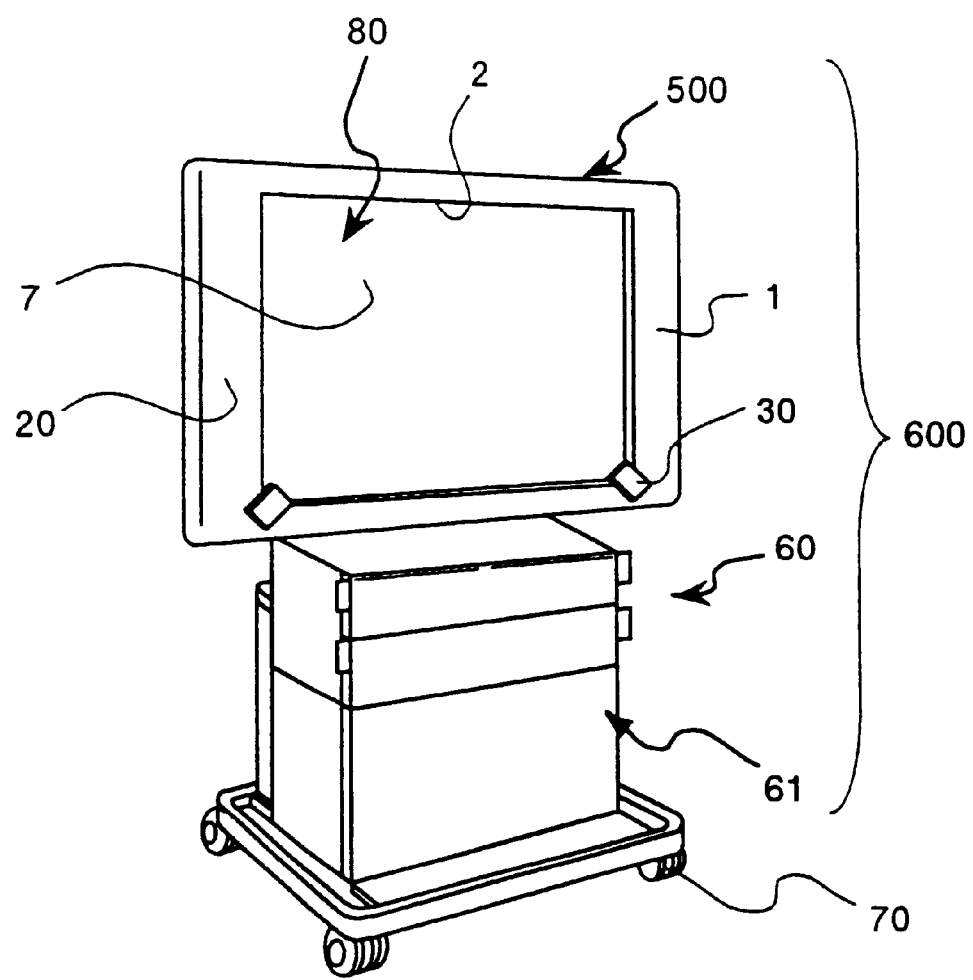
FIG. 22 is a perspective view showing the display board system according to Embodiment 5 of the present invention and a housing unit with the display board system accommodated therein.
Figure 23:
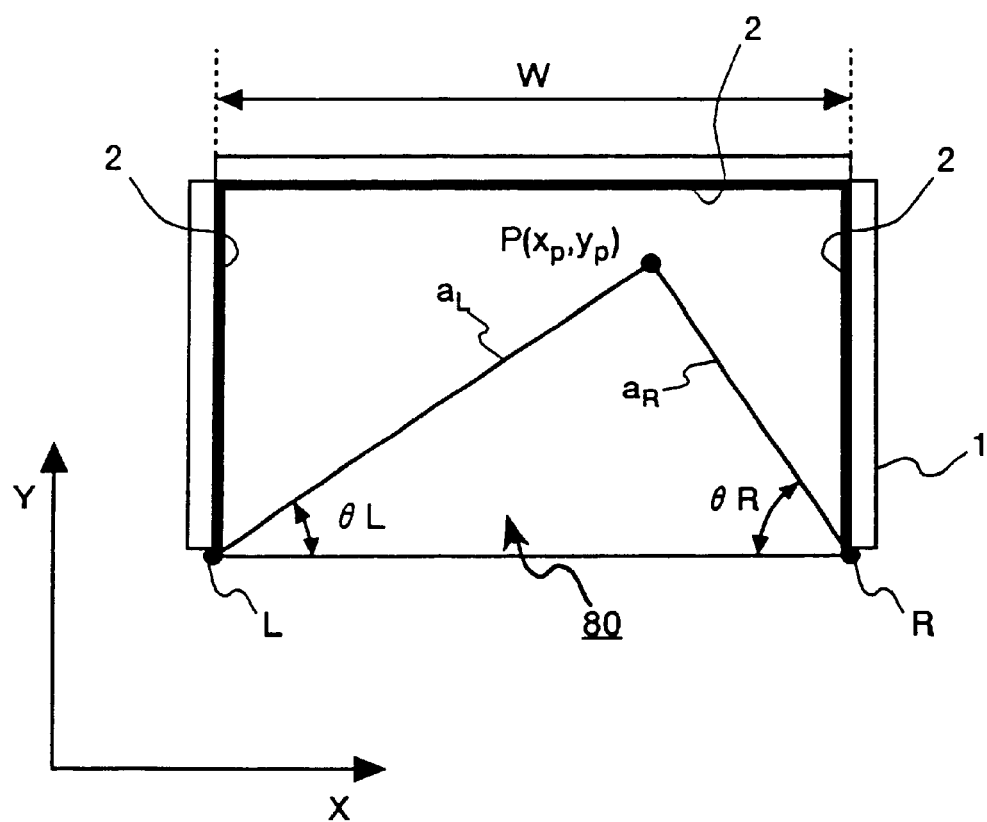
FIG. 23 is a view for explaining a blockage detecting principle of the coordinate-position input device such that light emitted from a light source is spread in a fan shape.
Figure 24:
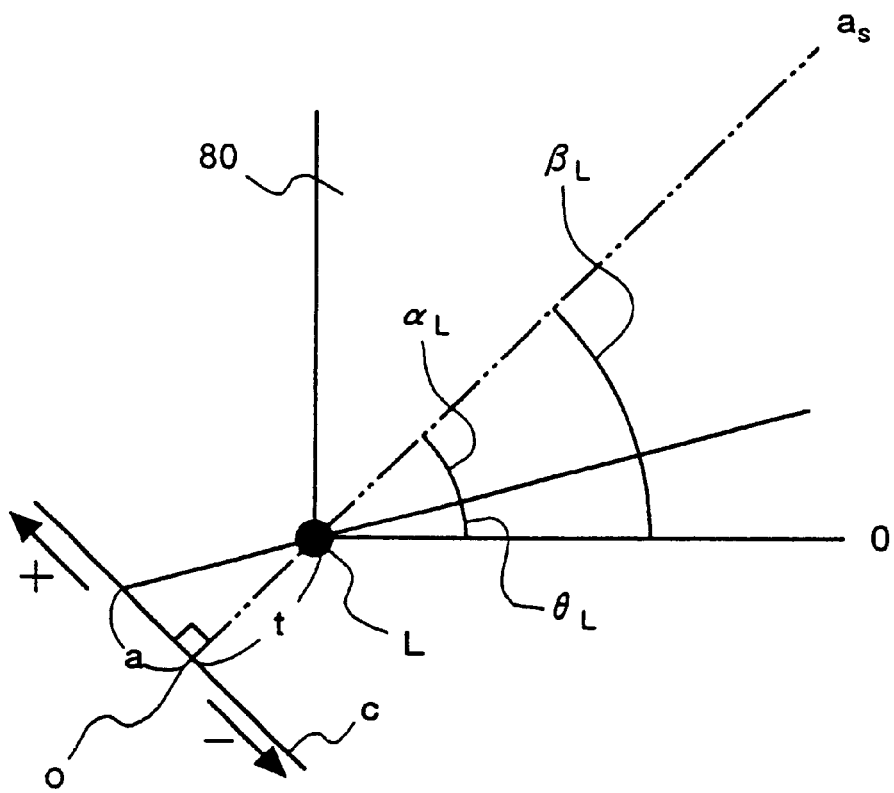
FIG. 24 is a view sowing a relation between emission angle, a light source, and an attached angle of the light source shown in FIG. 23.

FIG. 22 is a perspective view showing the display board system 500 according to Embodiment 5 and a housing unit 600 with the display board system 500 accommodated therein. The housing unit 600 comprises a panel section 500 with the input section 51 incorporated therein, a controller accommodating section 60 with the control unit 10 accommodated therein, an equipment accommodating section 61 with the PC 5 and the printer 9 accommodated therein, and further a caster section 70 for loading thereon the housing unit 600 as a whole to making the unit transportable.

The frame body 1 having the reflecting member 2 as well as optical units 20 and 30 are integrated to each other so as to be positioned in front of the white board 7 and accommodated in the panel section 500. When the user writes a character or the like on the white board with a pen, coordinate positions of this pen tip are successively read in association with movement of the pen tip. The read-in coordinate positions are accumulated in the RAM 14B by the control unit 10, and recorded therein as the locus of the pen tip, namely as a form of the written character and further the written contents.

The contents recorded as described above are sent to the printer 9 through the PC 5 to be printed onto a paper. Audiences hearing the presentation by using this display board system need not copy the written contents into a notebook or the like, which allows the audiences to concentrate on what is being presented. The contents send to the PC 5 can also be stored on an external memory such as a floppy desk herein. Therefore, the contents can arbitrarily be edited afterward.

In Embodiment 5 described above, the display board system is constructed with the coordinate-position input device described in Embodiment 3 or Embodiment 4, so that it is possible to detect the locus of a pen tip with high precision and accurately read the contents thereon. Thus, it is possible to provide a display board system enabling accurate reproduction of contents after the presentation.

In Embodiment 5 described above, the display board system is constructed with the coordinate-position input device described in Embodiment 3 or Embodiment 4, so that it is possible to instantly and quantitatively detect locational displacement in optical unit 20 and optical unit 30 and further correct the equations used for computing a position of a pen tip according to this displacement rate. Therefore, even if locational displacement occurs in the optical unit 20 and optical unit 30 due to change over time such as loose screws or shock, this displacement does not cause misidentification of a position of a pen tip. Accordingly Embodiment 5 can provide a high-reliability display board system.

It should be noted that the present invention is not limited to Embodiment 5 described above. For instance, as a display section, a blackboard or a plasma display or the like may be used other than the white board.

As described above, the present invention can input a coordinate position, by detachably attaching a frame body with two optical units integrated to each other to a writing surface of a white-board or a display surface of a display unit, forming a touch-panel surface by using the two optical units as well as reflecting members located in the frame body and detecting a position where the light for forming the touch-panel surface is blocked, on the writing surface or the display surface thereof, so that general versatility applicable to an ordinary discrete white board is provided.

The present invention can input a coordinate position, by detachably attaching a frame body to a writing surface of a white board or a display surface of a display unit using mounting members, further attaching two optical units to the frame body to adjust each irradiating direction of light therefrom, forming a touch-panel surface with the two optical units as well as reflecting members located in the frame body and detecting a position where the light for forming the touch-panel surface is blocked, on the writing surface or the display surface thereof, so that the user can select arrangement with which the highest precision of detecting a coordinate position can be obtained.

In the present invention, a computing section computes a coordinate position of a blocked point on the writing surface or the display surface from a direction of reflected light not received by light receiving sections of the two optical units as well as from a distance between the light receiving sections thereof, so that a coordinate position of the blocked point can be outputted from the coordinate-position input device.

In the present invention, when a coordinate-position input mode and an input suspend mode are exclusively specified by a specifying unit, a control unit provides controls over the two optical units and/or the computing section according to the specified mode, which allows the user to freely select either the case where a coordinate position is inputted through the touch-panel surface or the case where a coordinate position is not inputted, so that convenience when drawn contents on a white board are modified is enhanced.

In the present invention, the frame body can be attached in any of the longitudinal direction and the lateral direction, which allows flexibility for attaching the frame body to a writing surface of a white board or a display surface of a display unit to be enhanced, so that it is possible to provide a high-convenience coordinate-position input device.

In the present invention, the mounting member is made with any of a magnet, a hook, a form enabling hanging, a suction cup, a face-type fastener, an engaging form, and an adhesive or a combination thereof, which allows the device of the invention to be attached to the white board or display unit with its simple structure, so that it is possible to provide a high-convenience coordinate-position input device.

In the present invention, each edge of the frame is extendable in multi-steps by an adjustment mechanism, and the reflecting member is wound into a roll inside the adjustment mechanism when the frame edge is contracted, so that the device of the invention can be used with the frame body contracted when it is to be carried and extended when it is to be used, which allows its transportability to be enhanced.

In the present invention, each edge of the frame is extendable in multi-steps by an adjustment mechanism, and the reflecting member is extendable is also extendable in multi-steps together with the frame edge, so that the device of the invention can be used with the frame body contracted when it is to be carried and extended when it is to be used, which allows its transportability to be enhanced.

In the present invention, the coordinate position of the obstacle can be stored in a storing section, so that contents on the writing surface of a white board or contents on the display surface of a display unit can be stored in the coordinate-position input device.

In the present invention, the coordinate position of the obstacle can be stored in an external memory, and the stored contents are easily be accessed by utilizing some other equipment by attaching the external memory thereto, so that it is possible to provide a high-convenience coordinate-position input device.

In the present invention, the coordinate position of the obstacle can be stored on a frame memory, so that efficiency when drawn contents on a white board is processed is enhanced.

In the present invention, even before or after when a light emitting unit and a light detecting unit are attached or detached thereto or therefrom, a positional relation between the light emitting unit and the light detecting unit can be maintained to be constant at any time. Therefore, reliability of detecting a posit ion of a blockage is not affected by such an attachment or detachment. Each of the light emitting unit and light detecting unit can be aligned for each unit, so that alignment between the light emitting unit and light detecting unit can be made comparatively easily and with high precision.

In the present invention, even before or after when a light emitting unit and a light detecting unit are attached or detached to or from an area defining member, a positional relation between the light emitting unit and the light detecting unit can be maintained to be constant at any time, and in addition the state of emission and detection can also be maintained to be constant at any time. Therefore, an effect to prevent reliability of detecting a position of a blockage from its reduction due to their attachment and detachment is further enhanced. Also, the state of detection including the light emitting unit and light detecting unit can be aligned as one unit, so that alignment between the light emitting unit and light detecting unit can be made comparatively easily and with high precision.

In the present invention, the precision of alignment between the optical unit and an area defining member is comparatively easily be enhanced by providing indexing marks in side of the-optical unit as well as in the side of the area defining member. Therefore precision of detecting a blockage is comparatively easily enhanced, so that it is possible to provide a coordinate-position input device enabling accurate entry of a coordinate position of an inputted character or the like.

The present invention further comprises an attached-angle measuring unit, and instantly recognizes displacement in an optical-unit attached angle. Therefore, it is possible to provide a coordinate-position input device enabling accurate entry of a coordinate position of an inputted character or the like by instantly reflecting the displacement to the processing thereafter and detecting an accurate position of a blockage.

The present invention instantly recognizes displacement in an optical-unit attached angle and detects coordinates of the position of a blockage by correcting an operation equation in response to this displacement. Therefore, it is possible to provide a coordinate-position input device enabling accurate reading of written contents by correcting this displacement more easily and accurately detecting coordinate values of the position of the blockage.

In the present invention, occurrence of displacement in an optical-unit attached angle is visually recognized and coordinates of the position of a blockage are detected in response to this displacement. Therefore, it is possible to provide a coordinate-position input device enabling accurate reading of written contents by correcting this displacement with simpler structure and accurately detecting coordinate values of the position of the blockage.

In the present invention, the configuration thereof can be simplified by sharing a reading element and a light detecting unit to suppress an increase in the number of components. Therefore, load to maintenance of the device and chances of failure can be reduced and further cost of the device can be suppressed.

In the present invention, one of the inventions described above can be applied to a display board system. Thus, a display board system can be constructed using the coordinate-position input device with a light receiving section and a light source attachable thereto with high precision. Therefore, so that it is possible to provide a display board system enabling detection of written contents with high precision. In addition, the display board system can be constructed using the coordinate-position input device enabling accurate reading of written contents by accurately computing displacement in an attached angle and correcting this displacement more easily, so that it is possible to provide a high-reliability display board system.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A system, comprising:
    a device having a front writing surface and a back portion, the device being rigid;
    a support connected to the device;
    a frame configured to be attached to the device;
    a bracket attached to only one side of the frame without surrounding the frame and configured to prevent the frame from being removed from the device due to contact between the bracket and the back portion;
    a light source connected to the frame; and
    a light sensor connected to the frame.

2. A system according to claim 1, further comprising:
    a coordinate-position identifier,
    wherein the light source and the light sensor are electrically connected to the coordinate-position identifier.

3. The system of claim 2, further comprising:
    an interface section connected to the coordinate-position identifier; and
    a personal computer and a printer connected to the interface section.

4. A system according to claim 1, wherein:
    the bracket removably attaches the frame to the device.

5. The system of claim 1, wherein the device is a white board.

6. The system of claim 1, wherein the device is a plasma display.

7. The system of claim 1, wherein the light sensor includes:
    a charge coupled device ("CCD") sensor.

8. The system of claim 1, wherein the bracket comprises:
    a hook.

9. The system according to claim 1, wherein:
    the bracket rests on the device.

10. A system according to claim 1, wherein the system is free-standing.

11. A system, comprising:
    a writing surface connected to a rigid back portion;
    a support connected to the back portion;
    a frame configured to be mounted proximate to the writing surface;
    a bracket attached to only one side of the frame without surrounding the frame and configured to prevent the frame from being removed from a proximity of the writing surface due to contact between the bracket and the back portion;
    a light source connected to the frame; and
    a light sensor connected to the frame.

12. A system according to claim 11, further comprising:
    a coordinate-position identifier,
    wherein the light source and the light sensor are electrically connected to the coordinate-position identifier.

13. The system of claim 12, further comprising:
    an interface section connected to the coordinate-position identifier; and
    a personal computer and a printer connected to the interface section.

14. A system according to claim 11, wherein:
    the bracket removably attaches the frame to the writing surface.

15. The system of claim 11, further comprising:
    a white board which includes the writing surface and the back portion.

16. The system of claim 11, further comprising:
    a plasma display which includes the writing surface and the back portion.

17. The system of claim 11, wherein the light sensor includes:
    a charge coupled device ("CCD") sensor.

18. The system of claim 11, wherein the bracket comprises:
    a hook.

19. The system according to claim 11, further comprising:
    a device including the writing surface and the back portion, wherein:
    the bracket rests on the device.

20. A system according to claim 11, wherein the system is free-standing.

21. A system, comprising:
    a device having a front writing surface and a rigid back portion;
    a frame configured to be attached to the device;
    a bracket attached to only one side of the frame without surrounding the frame and configured to prevent the frame from being removed from the device due to contact between the bracket and the rigid back portion;
    a light source connected to the frame; and
    a light sensor connected to the frame.

22. A system according to claim 21, wherein:

the bracket is arranged to contact the back portion of the device.

23. A system according to claim 22, wherein:

a contact between the bracket and the back portion of the device prevents the frame from being removed from the device.

24. A system according to claim 22, wherein:

the bracket rests on the device.

25. A system according to claim 23, wherein:

the bracket rests on the device.

26. A system according to claim 21, further comprising:

a coordinate-position identifier, wherein the light source and the light sensor are electrically connected to the coordinate-position identifier.

27. The system of claim 26, further comprising:

an interface section connected to the coordinate-position identifier; and a personal computer and a printer connected to the interface section.

28. A system according to claim 22, wherein:

the bracket removably attaches the frame to the device.

29. The system of claim 22, wherein the device is a white board.

30. The system of claim 22, wherein the device is a plasma display.

31. The system of claim 22, wherein the light sensor includes:

a charge coupled device ("CCD") sensor.

32. The system claim 22, wherein the bracket comprises:

a hook.

33. A system according to claim 21, wherein the system is free-standing.

34. A system, comprising:

means for receiving writing by a person including a front writing surface and a rigid back portion;

means for supporting the means for receiving;

means for framing the front writing surface;

means, attached to only one side of the means for framing without surrounding the means for framing, for preventing the means for framing from being removed from the means for receiving due to contact between the means for preventing and the back portion;

means for illuminating, connected to the means for framing; and means for sensing light, connected to the means for framing.

35. A system according to claim 34, further comprising:

means for identifying a coordinate position, wherein the means for illuminating and the means for sensing light are electrically connected to the coordinate-position identifier.

36. The system of claim 35, wherein:

the means for identifying comprises a personal computer.

37. A system according to claim 34, wherein:

the means for preventing removably attaches the frame to the device.

38. The system of claim 34, wherein the means for receiving writing comprises:

a white board.

39. The system of claim 34, wherein the means for receiving writing comprises:

a plasma display.

40. The system of claim 34, wherein the means for sensing light comprises:

a charge coupled device.

41. The system of claim 34, wherein the means for preventing comprises:

a hook.

42. A system according to claim 34, the system is free-standing.

43. A method, comprising the steps of:

contacting a frame to a device having a front writing surface and a rigid back portion the frame connected to a light source and a light sensor; and arranging a bracket which is attached to only one side of the frame without surrounding the frame, to prevent the frame from losing contact with the device.

44. A method according to claim 43, further comprising the step of:

sensing a position using the light source and the light sensor.

45. A method according to claim 43, wherein the frame is free-standing.

46. A system, comprising:

a device having a front writing surface and a back portion, the device being rigid;

a support connected to the device;

a frame having four corner portions and configured to be attached to the device;

a bracket attached to the frame and configured to prevent the frame from being removed from the device due to contact between the bracket and the back portion; and an integrated optical unit having a light source and a light sensor, the integrated optical unit being detachably connected to any of the four corner portions of the frame.

* * * * *